US011893840B2

(12) United States Patent
Cardona et al.

(10) Patent No.: US 11,893,840 B2
(45) Date of Patent: *Feb. 6, 2024

(54) SYSTEMS AND METHODS FOR MODELING AND SIMULATION IN VEHICLE FORENSICS

(71) Applicant: State Farm Mutual Automobile Insurance Company, Bloomington, IL (US)

(72) Inventors: Alexander Cardona, Gilbert, AZ (US); Jerome Scott Trayer, Mesa, AZ (US); An Ho, Watertown, MA (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/723,124

(22) Filed: Apr. 18, 2022

(65) Prior Publication Data
US 2022/0237963 A1 Jul. 28, 2022

Related U.S. Application Data

(63) Continuation of application No. 16/579,045, filed on Sep. 23, 2019, now Pat. No. 11,308,741.
(Continued)

(51) Int. Cl.
*G07C 5/08* (2006.01)
*G08G 1/00* (2006.01)
(Continued)

(52) U.S. Cl.
CPC .......... *G07C 5/0841* (2013.01); *G06F 30/20* (2020.01); *G06F 40/205* (2020.01); *G07C 5/008* (2013.01);
(Continued)

(58) Field of Classification Search
CPC ........ G06F 30/20; G06F 40/20; G06F 40/205; G06F 40/211; G06F 40/216; G06F 40/221; G06F 40/226; G10L 15/26
See application file for complete search history.

(56) References Cited

U.S. PATENT DOCUMENTS 6,246,933 B1 6/2001 Bague
8,260,639 B1 9/2012 Medina, III et al.
(Continued)

FOREIGN PATENT DOCUMENTS

KR 101665553 B1 10/2016
KR 101689805 B1 12/2016

OTHER PUBLICATIONS

Dupuy et al., Generating a 3D Simulation of a Car Accident from a Written Description in Natural Language: the CarSim System, 2001, In Proceedings of the ACL 2001 Workshop on Temporal and Spatial Information Processing (Year: 2001).*
(Continued)

*Primary Examiner* — Russell Frejd
*Assistant Examiner* — Sara J Lewandroski
(74) *Attorney, Agent, or Firm* — Armstrong Teasdale LLP

(57) ABSTRACT

An autonomous vehicle (AV) including a vehicle body, and a vehicle computing device is provided. The vehicle computing device includes a processor in communication with a memory device. The processor is configured to identify a time and a geographic location of a traffic collision involving the AV, retrieve map data and contextual data associated with the time and the geographic location of the traffic collision, retrieve vehicle telematics data collected by sensors coupled to the vehicle body, determine for each of a plurality of moments in time during the traffic collision a position and an orientation of the AV during the traffic collision, generate a simulation of the traffic collision including a representation of the AV based upon the map data, the contextual data, and
(Continued)

the vehicle telematics data, and provide content to enable display of the simulation on a display device.

20 Claims, 8 Drawing Sheets

Related U.S. Application Data

(60) Provisional application No. 62/854,779, filed on May 30, 2019.

(51) Int. Cl.
*G08G 1/01* (2006.01)
*G07C 5/00* (2006.01)
*G06F 30/20* (2020.01)
*G06F 40/205* (2020.01)
*G10L 15/26* (2006.01)

(52) U.S. Cl.
CPC ........... *G08G 1/0137* (2013.01); *G08G 1/205* (2013.01); *G10L 15/26* (2013.01)

(56) References Cited

U.S. PATENT DOCUMENTS

| | | |
|---|---|---|
| 8,954,226 B1 | 2/2015 | Binion et al. |
| 9,311,271 B2 | 4/2016 | Wright |
| 9,633,487 B2 | 4/2017 | Wright |
| 9,691,189 B1 | 6/2017 | Creath |
| 9,934,625 B1 | 4/2018 | Wahba et al. |
| 10,192,369 B2 | 1/2019 | Wright |
| 10,198,879 B2 | 2/2019 | Wright |
| 10,223,753 B1 | 3/2019 | Marlow et al. |
| 10,246,037 B1 | 4/2019 | Shea et al. |
| 10,360,601 B1 | 7/2019 | Adegan |
| 11,094,318 B1 | 8/2021 | Erickson et al. |
| 11,157,973 B2 | 10/2021 | Fuchs |
| 2003/0154009 A1 | 8/2003 | Basir et al. |
| 2004/0111301 A1 | 6/2004 | Wahlbin et al. |
| 2005/0278082 A1* | 12/2005 | Weekes ................. G07C 5/008 701/1 |
| 2006/0092043 A1 | 5/2006 | Agassey |
| 2008/0161996 A1 | 7/2008 | Chang et al. |
| 2008/0252485 A1 | 10/2008 | Agassey |
| 2010/0030540 A1* | 2/2010 | Choi ...................... G06Q 40/08 342/357.31 |
| 2015/0029308 A1 | 1/2015 | Han et al. |
| 2015/0149218 A1 | 5/2015 | Bayley et al. |
| 2015/0373308 A1 | 12/2015 | Chen |
| 2016/0358467 A1* | 12/2016 | Jeong ............... G08G 1/096791 |
| 2017/0017734 A1 | 1/2017 | Groh et al. |
| 2017/0053461 A1 | 2/2017 | Pal et al. |
| 2017/0372431 A1 | 12/2017 | Perl et al. |
| 2018/0316901 A1* | 11/2018 | Carrier .................. G06V 20/56 |
| 2019/0050520 A1 | 2/2019 | Alvarez et al. |
| 2019/0072968 A1* | 3/2019 | Will, IV .............. G08G 1/0129 |
| 2019/0164229 A1 | 5/2019 | Sbianchi et al. |
| 2019/0232954 A1 | 8/2019 | Cinpinski et al. |
| 2020/0175861 A1 | 6/2020 | Wansa et al. |

OTHER PUBLICATIONS

"Bringing vision context to insurance—Nexar's innovative AI dash cam app is a claims processing game-changer." (2019). Nexar. Retrieved from https://www.getnexar.com/insurance/.

\* cited by examiner

SYSTEMS AND METHODS FOR MODELING AND SIMULATION IN VEHICLE FORENSICS

CROSS-REFERENCE TO RELATED APPLICATIONS

This application is a continuation of U.S. patent application Ser. No. 16/579,045, filed Sep. 23, 2019, and entitled "SYSTEMS AND METHODS FOR MODELING AND SIMULATION IN VEHICLE FORENSICS," which claims the benefit of priority to U.S. Provisional Patent Application Ser. No. 62/854,779, filed May 30, 2019, entitled "SYSTEMS AND METHODS FOR MODELING AND SIMULATION IN VEHICLE FORENSICS," the entire contents and disclosures of which are hereby incorporated herein by reference in its entirety.

FIELD OF THE INVENTION

The present disclosure relates to vehicle forensics and, more particularly, to systems and methods for modeling and simulating a vehicle collision based upon a geolocation of the collision, speech data, and/or vehicle telematics data.

BACKGROUND

In the event of a traffic collision, it may be necessary to determine the events leading up to the traffic collision, for example, in order to process an insurance claim or determine liability. These known vehicle forensics processes often occur remote from the scene of the collision, so those attempting to determine how the collision occurred must often gather information about the scene and circumstances of the collision, and then transfer this information to a remote location for processing the forensics. Typically, this involves gathering statements from those at the scene, such as individuals involved in the accident and police personnel.

Vehicle forensics may be used in the insurance claims process. The current insurance claims process may include a claims employee using the Internet to find a map of the location of the collision. Claims employees may be unable to validate the date or accuracy of such maps. Further, the process may include insurance claims employees receiving statements from drivers involved in the collision. Claims employees may often interpret and paraphrase such driver statements for a particular claims file. These statements given by drivers are based upon the driver's recollection of the accident, and may or may not be totally accurate. Further, paraphrasing the driver's statement by a claims employee may add additional error to the driver's account of the accident. Claims employees use this information to attempt to determine the events leading to the collision. For example, in some cases, claims employees will actually use toy cars to reconstruct accidents and points of contact for insurances claims processing. This process may be highly manual, costly, and prone to human error.

BRIEF SUMMARY

Systems and methods are configured to gather and analyze collision data, and make determinations in a vehicle forensics process using geolocation data, speech data, analytics data, and/or other vehicle telematics data. The collision data and artificial intelligence are leveraged to model and simulate a collision for a claims process.

In one aspect, an autonomous vehicle (AV) including a vehicle body, and a vehicle computing device is provided. The vehicle computing device includes a processor in communication with a memory device. The processor is configured to identify a time and a geographic location of a traffic collision involving the AV, retrieve map data and contextual data associated with the time and the geographic location of the traffic collision, retrieve vehicle telematics data collected by sensors coupled to the vehicle body, determine for each of a plurality of moments in time during the traffic collision a position and an orientation of the AV during the traffic collision, generate a simulation of the traffic collision including a representation of the AV based upon the map data, the contextual data, and the vehicle telematics data, and provide content to enable display of the simulation on a display device.

In another aspect, a computer-implemented method performed by an autonomous vehicle (AV) including a vehicle computing device is provided. The vehicle computing device includes a processor in communication with a memory device. The method includes identifying, by the vehicle computing device, a time and a geographic location of a traffic collision involving the AV; retrieving, by the vehicle computing device, map data and contextual data associated with the time and the geographic location of the traffic collision; retrieving, by the vehicle computing device, vehicle telematics data collected by sensors associated with the AV; determining, by the vehicle computing device, based upon the retrieved vehicle telematics data, for each of a plurality of moments in time during the traffic collision, a position and an orientation of the AV during the traffic collision; generating, by the vehicle computing device, a simulation of the traffic collision including a representation of the AV based upon the map data, the contextual data, and the vehicle telematics data; and providing, by the vehicle computing device, content to enable display of the simulation on a display device.

In another aspect, at least one non-transitory computer-readable media having computer-executable instructions embodied thereon, wherein when executed by an autonomous vehicle (AV) computing device that includes a processor, the computer-executable instructions cause the processor to identify a time and a geographic location of a traffic collision involving the AV; retrieve map data and contextual data associated with the time and the geographic location of the traffic collision; retrieve vehicle telematics data collected by sensors associated with the AV; determine, based upon the retrieved vehicle telematics data, for each of a plurality of moments in time during the traffic collision, a position and an orientation of the AV during the traffic collision; generate a simulation of the traffic collision including a representation of the AV based upon the map data, the contextual data, and the vehicle telematics data; and provide content to enable display of the simulation on a display device.

In another aspect, a vehicle forensics analytics ("VFA") computing device may be provided. The VFA computing device may include a processor in communication with a memory device, and the processor may be configured to: (1) determine a time and a location of a traffic collision; (2) retrieve map data and contextual data associated with the time and the location of the traffic collision; (3) receive speech data, the speech data corresponding to a statement given by a witness of the traffic collision; (4) parse the speech data for phrases describing the traffic collision; (5) determine, based upon the parsed speech data, for each of a plurality of moments in time during the traffic collision, a position and an orientation of a vehicle involved in the traffic collision; (6) generate a simulation including a representation of the vehicle involved in the traffic collision based upon the map data, the contextual data, and the determined position and orientation for each of the plurality of moments in time; and/or (7) display the simulation to facilitating reconstructing the traffic collision and the events surrounding and associated with the collision. The VFA computing device may include additional, less, or alternate functionality, including that discussed elsewhere herein.

In another aspect, a computer-implemented method for vehicle forensics may be provided. The computer-implemented method may be implemented by a vehicle forensics analytics ("VFA") computing device including a processor in communication with a memory device. The computer-implemented method including: (1) determining, by the VFA computing device, a time and a location of a traffic collision; (2) retrieving, by the VFA computing device, map data and contextual data associated with the time and the location of the traffic collision; (3) receiving, by the VFA computing device, speech data, the speech data corresponding to a statement given by a witness of the traffic collision; (4) parsing, by the VFA computing device, the speech data for phrases describing the traffic collision; (5) determining, by the VFA computing device, based upon the parsed speech data, for each of a plurality of moments in time during the traffic collision, a position and an orientation of a vehicle involved in the traffic collision; (6) generating, by the VFA computing device, a simulation including a representation of the vehicle involved in the traffic collision based upon the map data, the contextual data, and the determined position and orientation for each of the plurality of moments in time; and/or (7) displaying, by the VFA computing device, the simulation to facilitate traffic collision reconstruction. The method may include additional, less, or alternate actions, including those discussed elsewhere herein.

In another aspect, a non-transitory computer-readable media having computer-executable instructions embodied thereon may be provided. When executed by a vehicle forensics analytics ("VFA") computing device including a processor in communication with a memory device, the computer-executable instructions cause the processor to: (1) determine a time and a location of a traffic collision; (2) retrieve map data and contextual data associated with the time and the location of the traffic collision; (3) receive speech data, the speech data corresponding to a statement given by a witness of the traffic collision; (4) parse the speech data for phrases describing the traffic collision; (5) determine, based upon the parsed speech data, for each of a plurality of moments in time during the traffic collision, a position and an orientation of a vehicle involved in the traffic collision; (6) generate a simulation including a representation of the vehicle involved in the traffic collision based upon the map data, the contextual data, and the determined position and orientation for each of the plurality of moments in time; and/or (7) display the simulation to facilitate collision reconstruction. The instructions may direct additional, less, or alternate functionality, including that discussed elsewhere herein.

In another aspect, an autonomous vehicle (AV) including a vehicle forensics analytics ("VFA") computing device may be provided. The VFA computing device may include a processor in communication with a memory device. The processor may be configured to: (1) determine a time and a location of a traffic collision involving the AV; (2) retrieve map data and contextual data associated with the time and the location of the traffic collision; (3) receive speech data, the speech data corresponding to a statement given by a witness of the traffic collision; (4) parse the speech data for phrases describing the traffic collision; (5) determine, based upon the parsed speech data, for each of a plurality of moments in time during the traffic collision, a position and an orientation of the AV during the traffic collision; (6) generate a simulation including a representation of the AV based upon the map data, the contextual data, and the parsed speech data; and the determined position and orientation of the AV for each of the plurality of moments in time; and/or (7) display the simulation to facilitate collision reconstruction. The AV and/or VFA computing device may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
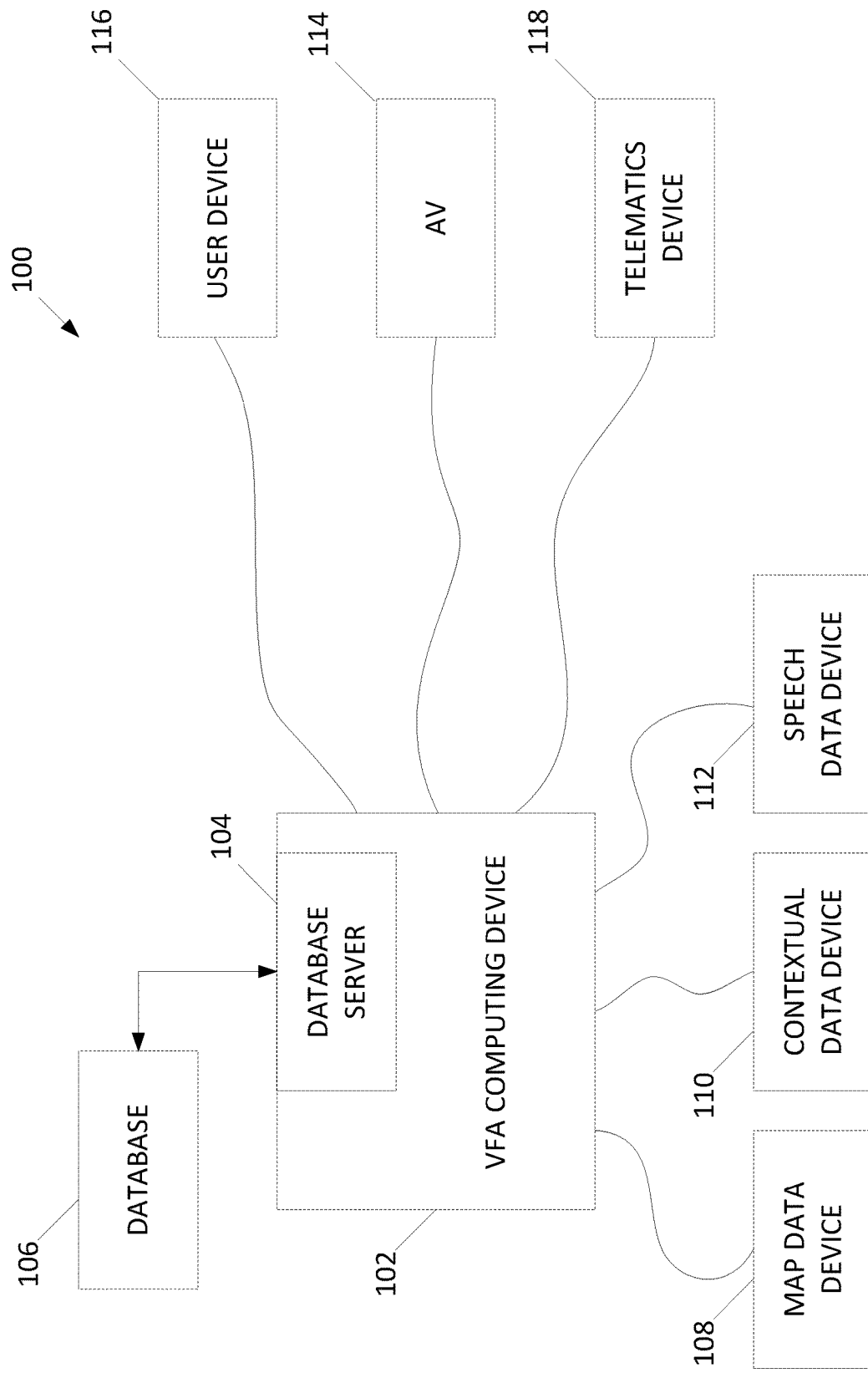
FIG. 1 depicts an exemplary vehicle forensics system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for vehicle forensics modeling and simulation. The disclosed systems and methods may include generating a simulation including a model of a scene of a vehicle collision based upon a time and location of the collision, map data, model data, and contextual data. The disclosed systems may also include generating a simulation of the vehicle collision based upon speech data from a witness account of the collision. The simulation may additionally or alternatively be based upon vehicle telematics data retrieved from a vehicle involved in the collision. In one exemplary embodiment, the process may be performed by a vehicle forensics analytics ("VFA") computing device.

As described below, the systems and methods described herein generate a simulation of a vehicle collision. By so doing, the systems and methods enable a determination of the events leading to the vehicle collision. Further, the systems and methods may verify eyewitness accounts of the vehicle collision, and may enable a determination of the cause of the vehicle collision. This may enable, for example, an efficient and accurate determination of liability and processing of insurance claims related to the vehicle collision.

Determining a Time and a Location of the Collision

The VFA computing device may be configured to determine a time and location of a vehicle collision. Determining the time and location enables the VFA computing device to generate a contextually accurate model and simulation of the collision. The VFA computing device may determine the time and the location, for example, by retrieving and analyzing time data (e.g., a timestamp) and location data (e.g., geographic coordinates) from one or more vehicles in involved in the collision.

In some example embodiments, retrieving the location data may include detecting the vehicle collision. Some vehicles, such as autonomous vehicles (AVs), are equipped with an automated driving system (ADS) that includes a plurality of sensors that may be used to detect a collision. The sensors may generate, for example, vehicle telematics data. Additionally or alternatively, a separate device onboard the vehicle (e.g., a mobile phone device or a telematics device installed by an insurance company) may generate vehicle telematics data. The VFA computing device may receive the vehicle telematics data, for example, through a WLAN-based or cellular-based vehicular communication system. Vehicle telematics data may include, but not limited to, acceleration data, deceleration data, and yaw data (e.g., data describing side-to-side rotation) of the vehicle. The VFA computing device may determine, for example, that a rapid change in the acceleration, deceleration, and/or yaw of the vehicle indicates that a vehicle collision occurred at the time of the rapid change and identify the time of the rapid change as the time of the collision. The VFA computing device may further identify the location of the collision using geographic coordinates of the vehicle at the time of the rapid change, for example, based upon data retrieved from a global positioning system (GPS) device present onboard the vehicle.

In some example embodiments, the VFA computing device may retrieve the time and location from a user device (e.g., a GPS-equipped mobile phone device) of an individual present at the scene of the collision. For example, an individual involved in the collision may contact his or her insurer to make an insurance claim, for example, by calling an insurance representative and/or by submitting the claim using a mobile application. Based upon the call and/or the submission through the mobile application, the VFA computing device may determine that an accident has occurred and record a time the call and/or submission was made (e.g., a timestamp). The VFA computing device may further retrieve the geographic coordinates (e.g., by communicating with the mobile device using the mobile application). The VFA computing device may identify the timestamp and retrieved geographic coordinates as the time and location of the collision.

In some example embodiments, the VFA computing device may retrieve the time and location of the collision from a third party. For example, a police report may include a time and geographic coordinates of a collision. The VFA computing device may retrieve a third party document such as a police report and parse the document for data regarding the time and the location of the collision (e.g., the geographic coordinates). The VFA computing device may identify the time and the location based upon the parsed data.

Retrieving Data

The VFA computing device may be further configured to retrieve data to generate a simulation. For example, the VFA computing device may retrieve map data.

As used herein, "map data" may refer to any data identifying geographic features associated with the scene of the collision. Examples of map data include, but are not limited to, the locations of vehicle thoroughfares (e.g., streets, roads, or highways), sidewalks, railroads, water features, structures (e.g., buildings, fences, guard rails, or walls), terrain and/or topographical features (e.g., hills), and/or objects (e.g., foliage, road signs, or utility poles). Map data may also include information regarding specific vehicle thoroughfares, for example, a number of lanes, a direction of travel of each lane, road-specific traffic regulations (e.g., speed limits, school zones, or weight limits), presence of regulatory signs and signals (e.g., lane markings, railroad crossing gates, stop signs, or traffic signals), road dimensions (e.g., width of the lanes), road features (e.g., the presence and type of medians or barriers, the material and condition of road surfaces, or the presence of bridges and tunnels), and/or road topography (e.g., inclines in the road).

The VFA computing device may retrieve map data, for example, from a map database that is updated periodically. For example, the VFA computing device may receive updated map data from a map data computing device and store the updated map data in the database. The VFA computing device may retrieve map data for each collision analyzed by the VFA computing device, enabling the VFA computing device to generate the simulation using up-to-date map information.

The VFA computing device may further retrieve contextual data. As used herein, "contextual data" may refer to any data identifying conditions at the scene of the collision at the time of the collision. Examples of contextual data include, but are not limited to, weather conditions, daylight or nighttime, traffic conditions (e.g., ambient traffic speed), construction, locations of vehicles, and/or current road conditions (e.g., lane closures, reduced speed limits, obstructions, or the presence of water).

The VFA computing device may retrieve contextual data, for example, from a contextual conditions database that is updated continuously or periodically. For example, the VFA computing device may receive updated contextual data from a contextual data computing device and store the updated contextual data in the database. In embodiments where at least some of the vehicles at the scene include sensors (e.g., AVs and/or vehicles equipped with telematics devices), the contextual data may include vehicle telematics data, for example, to determine positions and orientations of the vehicles at the time of the accident.

In some embodiments, the VFA computing device may retrieve additional data from vehicles that may provide information about the context of the collision, such as data obtained from video cameras and/or other sensors onboard the vehicle. For example, for a vehicle where the headlights and windshield wipers are controlled based upon sensor input, the VFA computing device may determine, based upon data indicating activation of headlights or windshield wipers, that conditions were dark or rainy, respectively. In some embodiments, the VFA computing device may further retrieve contextual data from video cameras and/or sensors that are not onboard the vehicle, such as surveillance cameras and/or sensors associated with a smart street system.

The VFA computing device may further retrieve vehicle specification data. As used herein, "vehicle specification data" includes any data related to characteristics of specific models of vehicles. For example, vehicle specification data may include crumple zones, mass (e.g., gross weight), dimensions, power, braking, traction, and other such characteristics of the vehicle. The VFA computing device may use vehicle specification data to accurately depict the vehicles in the simulation and ensure that behavior of the vehicles in the situation corresponds to a physically possible scenario.

The VFA computing device may further retrieve photographic data. As used herein, "photographic data" includes photographs and any data associated with the photographs (e.g., time stamps or geographic coordinates). For example, photographic data may include photographs taken of the scene of the collision and of damage to the vehicles. Photographs of the scene of the collision may include, for example, the final resting positions of the vehicles following the collision. Photographic data may further include video taken by cameras onboard the vehicle or cameras having a view of the scene of the collision (e.g. surveillance cameras).

The VFA computing device may further retrieve text data. As used herein, "text data" includes text (e.g., text documents). For example, text data may include documents describing the collision (e.g., a police report). The VFA computing device may parse text data for terms and phrases indicative of the behavior of the vehicles in the collision.

The VFA computing device may further retrieve physics data. As used herein, "physics data" includes any data that describes physical interactions such as physical rules (e.g., laws of physics). The physical rules may be applied to other data, (e.g., map data, contextual data, and vehicle specification data) to determine physical constraints for the simulation corresponding to realistic physics of the collision.

Analyzing Speech Data

The VFA computing device may be further configured to receive, parse, and analyze speech data. The speech data may correspond to an eyewitness account of the collision (e.g., a claims statement to an insurance representative). The VFA computing device may use the speech data, for example, to generate a simulation of the collision. The VFA computing device may further analyze the speech data, for example, to determine the accuracy of a statement represented by the speech data.

The VFA computing device may receive the speech data, for instance, from a speech data computing device associated with an insurance company receiving a claim. For example, the VFA computing device may receive an audio signal of a phone call including an eyewitness account from the speech data computing device. The VFA computing device may detect speech in the audio signal and automatically transcribe the speech into text in real time (e.g., during the phone call). The VFA computing device may further display the text in real time. The text may be used by the VFA computing device and/or individuals conducting vehicle forensics in analyzing the collision.

The VFA computing device may be further configured to parse the speech data to identify terms and phrases describing the collision. For example, the VFA computing device may parse the speech data for phrases indicating descriptions of movement (e.g., acceleration, speed, and direction), actions taken by the drivers (e.g., applying the brakes), descriptions of the collision (e.g., points of contact of the vehicles), and/or other information regarding the circumstances (e.g., information regarding compliance with traffic signs and/or signals). For each phrase, the VFA computing device may determine a moment in time with respect to the collision the phrase corresponds, for example, by analyzing the phrase's relative position within the statement (e.g., closer to the beginning or end of the statement) or by detecting phrases indicating sequence, (e.g., first, next, then, etc.).

The VFA computing device may determine the meaning of the descriptive phrases with respect to the collision to construct a sequence of events of the collision. The sequence of events may include, for example, the movement, positions, and orientations of vehicles at different moments in time during the collision. The VFA computing device may determine the meaning of phrases, for example, by looking up the phrases in a database. In certain embodiments, the VFA computing device may utilize machine learning to determine the meaning of phrases and construct the phrases into a sequence of events. Identifying phrases that describe the collision and determining their meaning enables the collision to be simulated.

Parsing the speech data further enables the VFA computing device to verify the accuracy and/or validity of the eyewitness account in real time by identifying inconsistent statements. For example, the VFA computing device may determine a driver's statement that he or she entered an intersection at a high rate of speed yet still stopped before crossing the intersection is inconsistent or physically impossible to have occurred the way described. In addition, the VFA computing device may compare statements to known map data or contextual data for consistency (e.g., a driver's statement that it was raining during the collision versus contextual data indicating it was sunny). The VFA computing device may flag such inconsistent statements to alert individuals conducting vehicle forensics. The VFA computing device may also reduce the weight such inconsistent statements are given when generating a simulation. In some embodiments, the VFA computing device may utilize machine learning to identify conflicting statements and verify the accuracy and/or validity of witness accounts.

Simulating the Collision

The VFA computing device is further configured to generate a simulation of the collision. The simulation may include, for example, a position and an orientation of each vehicle involved in the collision at a plurality of moments of time during the traffic collision. The VFA computing device may generate a series of representations of the scene of the accident corresponding to each of the plurality of moments of time and including the position and orientation of each vehicle. The VFA computing device may display the series of representations in sequence to illustrate the simulated collision. The simulation may thus be displayed to illustrate the collision and its context, enabling an individual who was not at the scene of the collision to comprehend and analyze the collision.

The VFA computing device may generate a simulation including a scene model depicting the scene of the collision. The scene model may be based upon, for example, map data and contextual data and enables individuals not present at the scene of the collision (e.g., insurance claims employees) to visualize the scene.

To generate the scene model, the VFA computing device may, for example, compile map data into a format that enables the VFA computing device to display a visual representation of the scene of the collision. The VFA computing device may compile data representing the road itself (e.g., the width of the road, the number of lanes, the terrain, etc.). The VFA computing device may further compile data representing a vicinity of the collision (e.g., the locations of structures and objects near the location).

To generate the scene model, the VFA computing device may compile contextual data into a format that enables the VFA computing device to display contextual conditions in the scene model. For example, the visual representation may include a representation of weather, construction, or the presence of traffic at the scene of the collision. In embodiments where the positions of specific vehicles are available, the visual representation may include representations of the specific vehicles at their respective locations. Such a visual representation enables an individual remote from and/or unfamiliar with the scene of the collision to understand the context of the collision. For example, the individual conducting the vehicle forensics may familiarize himself or herself with the scene prior to hearing eyewitness accounts of the collision to better be able to interpret and/or verify the accuracy of the eyewitness accounts.

To simulate the collision, the VFA computing device may determine the position and orientation of one or more vehicles involved in the collision for a plurality of moments in time during the collision. The VFA computing device may simulate the collision based upon, for example, speech data and/or vehicle telematics data. The VFA computing device may further use additional data to simulate the collision (e.g., vehicle specification data, photographic data, text data, and/or physics data).

The VFA computing device may determine the position and orientation of the vehicle based upon the speech data. The VFA computing device may use speech data to determine the positions and orientations of the vehicles involved in the collision. For example, the VFA computing device may interpret phrases indicating the relative positions of vehicles to determine the behavior of the vehicles during the collision. The VFA computing device may further interpret phrases indicating motion (e.g., direction of travel, speed, acceleration, etc.) and contact (e.g., parts of vehicles and/or objects that came into contact during the collision) to infer the positions and orientations of vehicles during the collision. In certain embodiments, the VFA computing device may utilize machine learning techniques to develop a model for accurately simulating a collision based upon speech data.

Based upon the speech data, the VFA computing device may generate visual representations of vehicles involved in the accident based upon the determined positions and orientations of the vehicles over the course of the collision. For example, the visual representations may appear to move and come into contact in a manner as described in the speech data. To generate the simulation using speech data, the VFA computing device may disregard speech data that the VFA computing device determines to be conflicting. Thus, the simulation may conform as close as possible to an eyewitness statement while maintaining a physically accurate depiction of the collision.

Additionally or alternatively, the VFA computing device may determine the position and orientation of the vehicle based upon vehicle telematics data. Vehicle telematics data includes data retrieved from a sensor-equipped vehicle involved in the collision (e.g., an AV) or a device onboard a vehicle involved in the collision (e.g., a mobile phone device or a telematics device installed by an insurance company). Vehicle telematics data may include data derived from, for example, an accelerometer, gyroscope, or GPS device, and indicate the position, yaw, speed, acceleration, deceleration, braking, cornering, and other characteristics of the vehicle's motion and orientation. Such vehicle telematics data may be used by the VFA computing device to determine the behavior of the vehicle from which it is derived during the collision. To generate the simulation, the VFA computing device may generate a representation of the vehicle from which the vehicle telematics data was received that behaves in accordance with the telematics data (e.g., the simulated vehicle appears to move and change orientation in accordance with the telematics data). The simulation thus reflects the actual behavior of the vehicle in the collision and enables analysis of the collision even in cases where no eyewitnesses are available or present at the scene of the collision.

The VFA computing device may further determine the position and orientation of the vehicle based upon vehicle specification data. The VFA computing device may use vehicle specification data to accurately depict the vehicles in the simulation and ensure that behavior of the vehicles in the situation corresponds to a physically possible scenario. For example, the VFA computing device may simulate the collision such that simulated representation of a vehicle does not outperform the actual capabilities of the vehicle (e.g., by accelerating and decelerating as an actual vehicle with the same specifications could) and behaves realistically when coming into simulated contact with other representations of vehicles or objects (e.g., by appearing to move and deform as an actual vehicle having the same specifications would).

The VFA computing device may further determine the position and orientation of the vehicle based upon photographic data. For example, photographic data may include photographs taken of the scene of the collision and of damage to the vehicles. Photographs of the scene of the collision may include, for example, the final resting positions of the vehicles following the collision. Photographic data may further include video taken by cameras onboard the vehicle or cameras having a view of the scene of the collision (e.g. surveillance cameras). The VFA computing device may generate the simulation so that the position and orientation of representations of the vehicles corresponds to the positions of the vehicles in photographs and/or of the scene at the moment depicted by the photograph and/or video. Photographs of damage to the vehicles may indicate points of contact (e.g., points of damage indicating contact between two vehicles or between vehicles and objects) during the collision. The VFA computing device may generate the simulation so that the points of contact in the simulated collision correspond to points of contact indicated by the photographs.

The VFA computing device may further determine the position and orientation of the vehicle based upon text data. For example, text data may include documents describing the collision (e.g., a police report). The VFA computing device may parse text data for terms and phrases indicative of the behavior of the vehicles in the collision. The VFA computing device may utilize the parsed text data to determine the positions and orientations of vehicles during the course of the collision.

The VFA computing device may further determine the position and orientation of the vehicle based upon physics data. The VFA computing device may apply physics data to other data, (e.g., map data, contextual data, and vehicle specification data) to determine physical constraints for the simulation corresponding to realistic physics of the collision. For example, the VFA computing device may apply information regarding the coefficient of friction of the road surface and the mass of a vehicle to determine a maximum capability of the vehicle to decelerate. If, for example, speech data indicates that the vehicle decelerated at a faster rate than is physically possible, the VFA computing device may disregard the conflicting speech data when simulating the collision. The simulation thus may more accurately reflect the actual behavior of the vehicle in the collision.

At least one of the technical problems addressed by this system may include: (i) inability of a computing device to automatically determine a geographic location of a vehicle collision; (ii) inability of a computer to accurately display a model of a scene of a vehicle collision to a user remote from the scene; (iii) inability of a computing device to interpret speech describing a vehicle collision; (iv) inefficiency in verifying the accuracy of an eyewitness account of a vehicle collision; (v) inability to generate a computer simulation of a vehicle collision based upon speech data; and (vi) inability to generate a computer simulation of a vehicle collision without eyewitnesses.

A technical effect of the systems and processes described herein may be achieved by performing at least one of the following steps: (i) determining a time and a location of a traffic collision; (ii) retrieving map data and contextual data associated with the time and the location of the traffic collision; (iii) receiving speech data, the speech data corresponding to a statement given by a witness of the traffic collision; (iv) parsing the speech data for phrases describing the traffic collision; (v) determining, based upon the parsed speech data, for each of a plurality of moments in time during the traffic collision, a position and an orientation of a vehicle involved in the traffic collision; (vi) generating a simulation including a representation of the vehicle involved in the traffic collision based upon the map data, the contextual data, and the determined position and orientation for each of the plurality of moments in time; and (vii) displaying the simulation.

The technical effect achieved by this system may be at least one of: (i) ability of a computing device to automatically determine the geographic location of a vehicle collision; (ii) ability of a computer to accurately display a model of a scene of a vehicle collision to a user remote from the scene; (iii) ability of a computing device to interpret speech describing a vehicle collision; (iv) ability of a computing device to verifying the accuracy of an eyewitness account of a vehicle collision; (v) ability to generate a computer simulation of a vehicle collision based upon speech data; (vi) ability to generate a computer simulation of a vehicle collision without eyewitnesses (vii) more accurately model or simulate how a collision actually occurred (viii) streamline the insurance claims process so that information can be gathered from a plurality of sources and then synthesized to determine which collected data is most likely accurate; and (ix) build a model of a simulation that most accurately tracks the data collected and physical conditions and expedite the insurance claims process.

Exemplary Vehicle Forensics System

FIG. 1 depicts an exemplary vehicle forensics system 100. In the exemplary embodiment, vehicle forensics system 100 includes a vehicle forensics analytics (VFA) computing device 102. VFA computing device may include a database server 104 and be in communication with a database 106 and/or other memory devices. VFA computing device 102 may also be in communication with, for example, a map data computing device 108, a contextual data computing device 110, a speech data computing device 112, an autonomous vehicle (AV) 114, a user device 116, and/or a telematics device 118.

In the exemplary embodiment, VFA computing device 102 may determine a time and location of a vehicle collision. The determined time and location enable VFA computing device 102 to generate a contextually accurate model and simulation of the collision. VFA computing device 102 may determine the time and the location, for example, by retrieving and analyzing time data (e.g., a timestamp) and location data (e.g., geographic coordinates).

In some example embodiments, VFA computing device 102 may retrieve the location data by detecting the vehicle collision. Some vehicles, such as autonomous vehicles (AVs) (e.g., AV 114), are equipped with an automated driving system (ADS) that includes a plurality of sensors that may be used to detect a collision. Such sensors may generate, for example, vehicle telematics data. Additionally or alternatively, a separate device onboard the vehicle may generate vehicle telematics data. For example, user device 116 (e.g., a mobile phone device) and/or telematics device 118 (e.g., a telematics device installed in the vehicle by an insurance company) may generate vehicle telematics data. VFA computing device 102 may receive the vehicle telematics data, for example, through a WLAN-based or cellular-based vehicular communication system. VFA computing device 102 may determine, for example, that a rapid change in the acceleration, deceleration, and/or yaw of the vehicle (e.g., AV 114) indicates that a vehicle collision occurred at the time of the rapid change and identify the time of the rapid change as the time of the collision. VFA computing device 102 may further identify the location of the collision using geographic coordinates of the vehicle at the time of the rapid change, for example, based upon data retrieved from a global positioning system (GPS) device present onboard the vehicle.

In some example embodiments, VFA computing device 102 may retrieve the time and location from user device 116, which may be, for example, a GPS-equipped mobile phone device. For example, an individual involved in the collision may contact his or her insurer to make an insurance claim, for example, by calling an insurance representative with user device 116 and/or by submitting the claim using a mobile application installed on user device 116. Based upon the call and/or the submission through the mobile application, VFA computing device 102 may determine that an accident has occurred and record a time the call and/or submission was made (e.g., a timestamp). VFA computing device 102 may further retrieve the geographic coordinates of user device 116. VFA computing device 102 may identify the timestamp and retrieved geographic coordinates as the time and location of the collision.

In some example embodiments, VFA computing device 102 may retrieve the time and location of the collision from a third party. For example, a police report may include the geographic coordinates of a collision. VFA computing device 102 may retrieve a third party document such as a police report and parse the document for data regarding the time and the location of the collision (e.g., the geographic coordinates). VFA computing device 102 may identify the time and the location based upon the parsed data.

VFA computing device 102 may be further configured to retrieve data to generate the simulation. VFA computing device 102 may retrieve, for example, map data, contextual data, vehicle specification data, photographic data, text data, and physics data.

VFA computing device 102 may retrieve map data, for example, from database 106. For example, VFA computing device may receive updated map data from a map data computing device 108 and store the updated map data in the database 106. VFA computing device 102 may retrieve map data for each collision analyzed by VFA computing device 102, enabling VFA computing device 102 to generate the simulation using up-to-date map information.

VFA computing device 102 may retrieve contextual data, for example, from database 106 that is updated continuously or periodically. For example, VFA computing device 102 may receive updated contextual data from a contextual data computing device 110 and store the updated contextual data in the database 106. In embodiments where at least some of the vehicles at the scene include sensors (e.g., AV 114 and/or a vehicle equipped with telematics device 118), the contextual data may include vehicle telematics data, for example, to determine positions and orientations of the vehicles at the time of the accident.

In some embodiments, VFA computing device 102 may retrieve additional data from vehicles (e.g., AV 114) that may provide information about the context of the collision, such as data obtained from video cameras and/or other sensors onboard the vehicle. For example, if headlights and windshield wipers of AV 114 are controlled based upon sensor input, VFA computing device 102 may determine, based upon data indicating activation of headlights or windshield wipers of AV 114, that conditions were dark or rainy, respectively. In some embodiments, VFA computing device 102 may further retrieve contextual data from video cameras and/or sensors that are not onboard the vehicle, such as surveillance cameras and/or sensors associated with a smart street system.

In the example embodiment, VFA computing device 102 may be further configured to retrieve, parse, and analyze speech data. The speech data may correspond to an eyewitness account of the collision (e.g., a claims statement to an insurance representative). VFA computing device 102 may use the speech data, for example, to generate a simulation of the collision. VFA computing device 102 may further analyze the speech data, for example, to determine the accuracy of a statement represented by the speech data.

VFA computing device 102 may receive the speech data, for example, from speech data computing device 112. Speech data computing device 112 may be associated with, for example, an insurance company receiving a claim. For example, VFA computing device 102 may receive an audio signal of a phone call including an eyewitness account from speech data computing device 112. VFA computing device 102 may detect speech in the audio signal and automatically transcribe the speech into text in real time (e.g., during the phone call). VFA computing device 102 may further display the text in real time. The text may be used by VFA computing device 102 and/or individuals conducting vehicle forensics in analyzing the collision.

VFA computing device 102 may further parse the speech data to identify terms and phrases describing the collision. For example, VFA computing device 102 may parse the speech data for phrases indicating descriptions of movement (e.g., acceleration, speed, and direction), actions taken by the drivers (e.g., applying the brakes), descriptions of the collision (e.g., points of contact of the vehicles), and/or other information regarding the circumstances (e.g., information regarding compliance with traffic signs and/or signals). For each phrase, VFA computing device 102 may determine a moment in time with respect to the collision the phrase corresponds, for example, by analyzing the phrase's relative position within the statement (e.g., closer to the beginning or end of the statement) or by detecting phrases indicating sequence, (e.g., first, next, then, etc.).

VFA computing device 102 may determine the meaning of the descriptive phrases with respect to the collision to construct a sequence of events the collision. The sequence of events may include, for example, the movement, positions, and orientations of vehicles at different moments in time during the collision. VFA computing device 102 may determine the meaning of phrases, for example, by looking up the phrases comparing the phrases to, for example, tables stored in database 106. In certain embodiments, VFA computing device 102 may utilize machine learning to determine the meaning of phrases and construct the phrases into a sequence of events. Identifying phrases that describe the collision and determining their meaning enables the collision to be simulated.

Parsing the speech data further enables VFA computing device 102 to verify the accuracy and/or validity of the eyewitness account in real time by identifying inconsistent statements. For example, VFA computing device 102 may determine a driver's statement that he or she entered an intersection at a high rate of speed yet still stopped before crossing the intersection is inconsistent. In addition, VFA computing device 102 may compare statements to known map data or contextual data for consistency (e.g., a driver's statement that it was raining during the collision versus contextual data indicating it was sunny). VFA computing device 102 may flag such inconsistent statements to alert individuals conducting vehicle forensics. VFA computing device 102 may further reduce the weight such inconsistent statements are given when generating a simulation. In some embodiments, VFA computing device 102 may utilize machine learning to identify conflicting statements and verify the accuracy and/or validity of witness accounts.

In the example embodiment, VFA computing device 102 is further configured to generate a simulation of the collision. The simulation may include, for example, a position and an orientation of each vehicle involved in the collision at a plurality of moments of time during the traffic collision. VFA computing device 102 may generate a series of representations of the scene of the accident corresponding to each of the plurality of moments of time and including the position and orientation of each vehicle. VFA computing device 102 may display the series of representations in sequence to illustrate the simulated collision. The simulation may thus be displayed to illustrate the collision and its context, enabling an individual who was not at the scene of the collision to comprehend and analyze the collision.

VFA computing device 102 may generate a simulation including a scene model depicting the scene of the collision. The scene model may be based upon, for example, map data and contextual data and enables individuals not present at the scene of the collision (e.g., insurance claims employees) to visualize the scene.

To generate the scene model, VFA computing device 102 may, for example, compile map data into a format that enables VFA computing device 102 to display a visual representation of the scene of the collision. VFA computing device 102 may compile data representing the road itself (e.g., the width of the road, the number of lanes, the terrain, etc.). VFA computing device 102 may further compile data representing a vicinity of the collision (e.g., the locations of structures and objects near the location).

To generate the scene model, VFA computing device 102 may compile contextual data into a format that enables VFA computing device 102 to display contextual conditions in the scene model. For example, the visual representation may include a representation of weather, construction, or the presence of traffic at the scene of the collision. In embodiments where the positions of specific vehicles are available, the visual representation may include representations of the specific vehicles at their respective locations. Such a visual representation enables an individual remote from and/or unfamiliar with the scene of the collision to understand the context of the collision. For example, the individual conducting the vehicle forensics may familiarize himself or herself with the scene prior to hearing eyewitness accounts of the collision to better be able to interpret and/or verify the accuracy of the eyewitness accounts.

To simulate the collision, VFA computing device 102 may determine the position and orientation of one or more vehicles involved in the collision for a plurality of moments in time during the collision. The VFA computing device 102 may simulate the collision based upon, for example, speech data and/or vehicle telematics data. VFA computing device 102 may further use additional data to simulate the collision (e.g., vehicle specification data, photographic data, text data, and/or physics data).

VFA computing device 102 may determine the position and orientation of the vehicle based upon the speech data. VFA computing device 102 may use speech data to determine the positions and orientations of the vehicles involved in the collision. For example, VFA computing device 102 may interpret phrases indicating the relative positions of vehicles to determine the behavior of the vehicles during the collision. VFA computing device 102 may further interpret phrases indicating motion (e.g., direction of travel, speed, acceleration, etc.) and contact (e.g., parts of vehicles and/or objects that came into contact during the collision) to infer the positions and orientations of vehicles during the collision. In certain embodiments, VFA computing device 102 may utilize machine learning techniques to develop a model for accurately simulating a collision based upon speech data.

Based upon the speech data, VFA computing device 102 may generate visual representations of vehicles involved in the accident based upon the determined positions and orientations of the vehicles over the course of the collision. For example, the visual representations may appear to move and come into contact in a manner as described in the speech data. To generate the simulation using speech data, VFA computing device 102 may disregard speech data that VFA computing device 102 determines to be conflicting. Thus, the simulation may conform as close as possible to an eyewitness statement while maintaining a physically accurate depiction of the collision.

Additionally or alternatively, VFA computing device 102 may determine the position and orientation of the vehicle based upon vehicle telematics data. Vehicle telematics data includes data retrieved from a sensor-equipped vehicle involved in the collision (e.g., AV 114) or a device onboard a vehicle involved in the collision (e.g., telematics device 118). Vehicle telematics data may include data derived from, for example, an accelerometer, gyroscope, or GPS device, and indicate the position, yaw, speed, acceleration, deceleration, and other characteristics of the vehicle's motion and orientation. Such vehicle telematics data may be used by VFA computing device 102 to determine the behavior of the vehicle from which it is derived during the collision. To generate the simulation, VFA computing device 102 may generate a representation of the vehicle from which the vehicle telematics data was received that behaves in accordance with the telematics data (e.g., the simulated vehicle appears to move and change orientation in accordance with the telematics data). The simulation thus reflects the actual behavior of the vehicle in the collision and enables analysis of the collision even in cases where no eyewitnesses are available or present at the scene of the collision.

VFA computing device 102 may further determine the position and orientation of the vehicle based upon vehicle specification data. VFA computing device 102 may use vehicle specification data to accurately depict the vehicles in the simulation and ensure that behavior of the vehicles in the situation corresponds to a physically possible scenario. For example, VFA computing device 102 may simulate the collision such that simulated representation of a vehicle does not outperform the actual capabilities of the vehicle (e.g., by accelerating and decelerating as an actual vehicle with the same specifications could) and behaves realistically when coming into simulated contact with other representations of vehicles or objects (e.g., by appearing to move and deform as an actual vehicle having the same specifications would).

VFA computing device 102 may further determine the position and orientation of the vehicle based upon photographic data. For example, photographic data may include photographs taken of the scene of the collision and of damage to the vehicles. Photographs of the scene of the collision may include, for example, the final resting positions of the vehicles following the collision. Photographic data may further include video taken by cameras onboard the vehicle or cameras having a view of the scene of the collision (e.g. surveillance cameras). VFA computing device 102 may generate the simulation so that the position and orientation of representations of the vehicles corresponds to the positions of the vehicles in photographs and/or of the scene at the moment depicted by the photograph and/or video. Photographs of damage to the vehicles may indicate points of contact (e.g., points of damage indicating contact between two vehicles or between vehicles and objects) during the collision. VFA computing device 102 may generate the simulation so that the points of contact in the simulated collision correspond to points of contact indicated by the photographs.

VFA computing device 102 may further determine the position and orientation of the vehicle based upon text data. For example, text data may include documents describing the collision (e.g., a police report). VFA computing device 102 may parse text data for terms and phrases indicative of the behavior of the vehicles in the collision. VFA computing device 102 may utilize the parsed text data to determine the positions and orientations of vehicles during the course of the collision.

VFA computing device 102 may further determine the position and orientation of the vehicle based upon physics data. VFA computing device 102 may apply physics data to other data, (e.g., map data, contextual data, and vehicle specification data) to determine physical constraints for the simulation corresponding to realistic physics of the collision. For example, VFA computing device 102 may apply information regarding the coefficient of friction of the road surface and the mass of a vehicle to determine a maximum capability of the vehicle to decelerate. If, for example, speech data indicates that the vehicle decelerated at a faster rate than is physically possible, VFA computing device 102 may disregard the conflicting speech data when simulating the collision. The simulation thus may more accurately reflect the actual behavior of the vehicle in the collision.

Exemplary Client Computing Device

Figure 2:
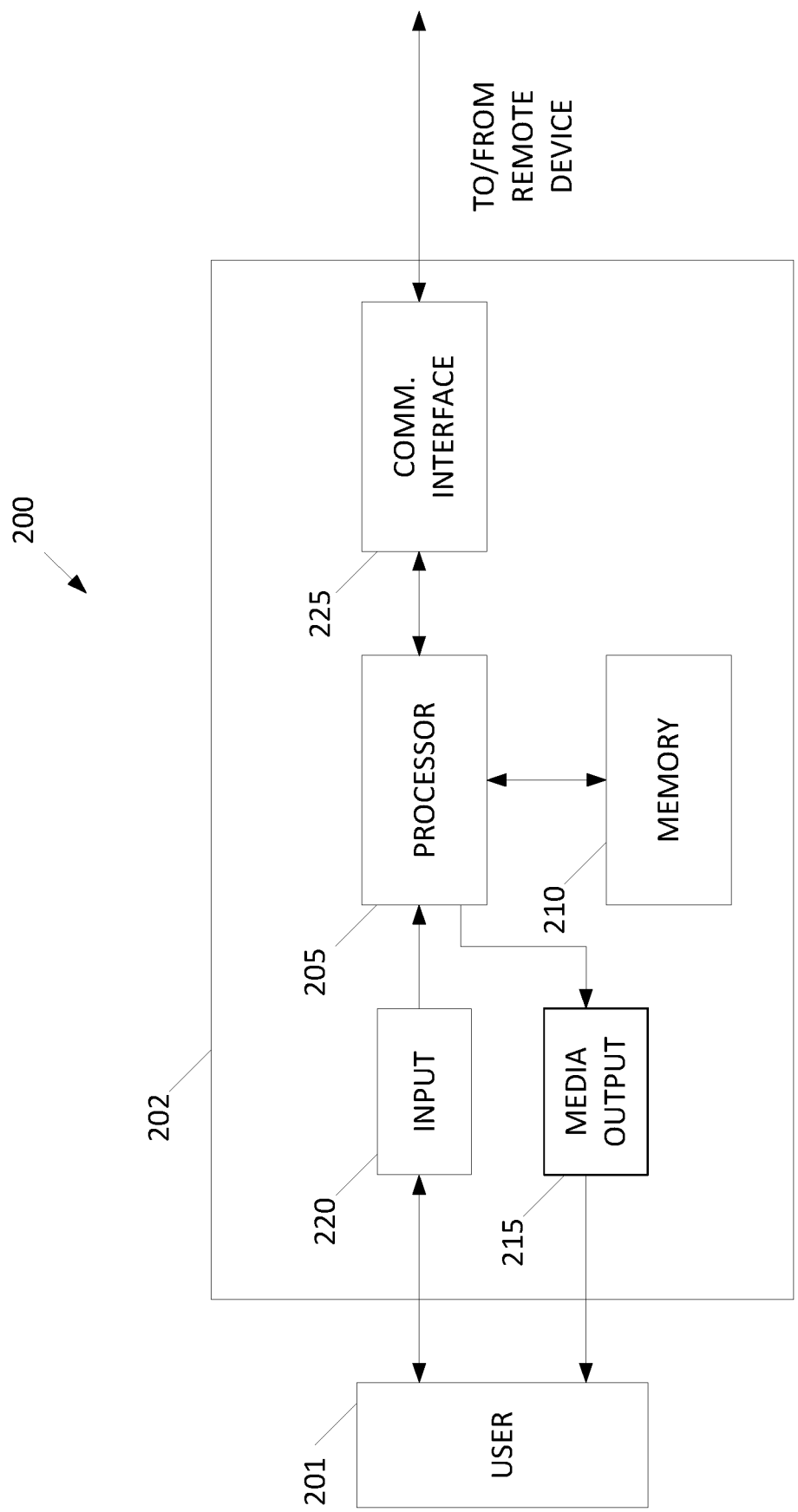
FIG. 2 depicts an exemplary client computing device that may be used with the vehicle forensics system illustrated in FIG. 1.

FIG. 2 depicts an exemplary client computing device 202. Client computing device 202 may be, for example, at least one of map data computing device 108, contextual data computing device 110, speech data computing device 112, AV 114, user device 116, and/or telematics device 118 (all shown in FIG. 1).

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In exemplary embodiments, client computing device 202 may also include at least one media output component 215 for presenting information to a user 201. Media output component 215 may be any component capable of conveying information to user 201. In some embodiments, media output component 215 may include an output adapter such as a video adapter and/or an audio adapter. An output adapter may be operatively coupled to processor 205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

Client computing device 202 may also include an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Client computing device 202 may also include a communication interface 225, which can be communicatively coupled to a remote device such as VFA computing device 102 (shown in FIG. 1). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 may be, for example, computer readable instructions for providing a user interface to user 201 via media output component 215 and, optionally, receiving and processing input from input device 220. A user interface may include, among other possibilities, a web browser and client application. Web browsers may enable users, such as user 201, to display and interact with media and other information typically embedded on a web page or a website. A client application may allow user 201 to interact with a server application from VFA computing device 102 (shown in FIG. 1), for example, to view a simulation generated by VFA computing device 102.

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server System

Figure 3:
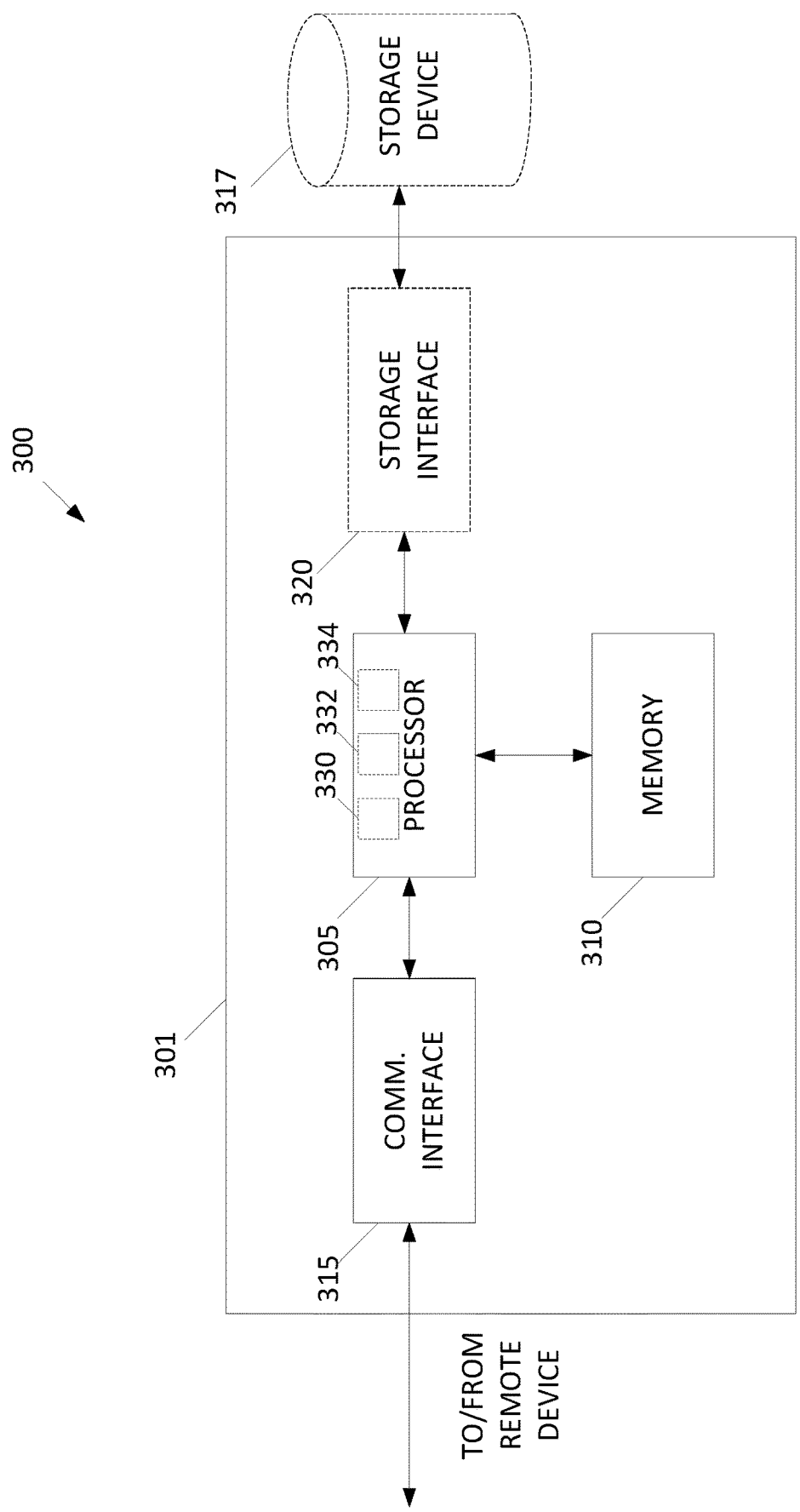
FIG. 3 depicts an exemplary server system that may be used with the vehicle forensics system illustrated in FIG. 1.

FIG. 3 depicts an exemplary server system that may be used with the vehicle forensics system illustrated in FIG. 1. Server system 301 may be, for example, VFA computing device 102 (shown in FIG. 1).

In exemplary embodiments, server system 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

In exemplary embodiments, processor 305 may include and/or be communicatively coupled to one or more modules for implementing the systems and methods described herein. Processor 305 may contain a location determining module 330 configured to determine a time and a location of a traffic collision. Processor 305 may also include a speech analysis module 332 configured to parse speech data corresponding to a statement given by a witness of the traffic collision and parse the speech data for phrases describing the traffic collision. Processor 305 may also include a simulation module 334 configured to determine based upon the speech data, for each of a plurality of moments in time during the traffic collision, a position and an orientation of a vehicle involved in the traffic collision and generate a simulation including a representation of the vehicle involved in the traffic collision, the simulation based upon map data, contextual data, and the position and orientation of the vehicle involved in the traffic collision at each of the plurality of moments in time. Additionally or alternatively, simulation module 334 may be configured to determine, based upon vehicle telematics data, for each of a plurality of moments in time during the traffic collision, a position and an orientation of the vehicle.

Processor 305 may be operatively coupled to a communication interface 315 such that server system 301 is capable of communicating with map data computing device 108, contextual data computing device 110, speech data computing device 112, AV 114, user device 116, and/or telematics device 118 (all shown in FIG. 1), or another server system 301. For example, communication interface 315 may receive requests from user device 116 via the Internet.

Processor 305 may also be operatively coupled to a storage device 317, such as database 120 (shown in FIG. 1). Storage device 317 may be any computer-operated hardware suitable for storing and/or retrieving data. In some embodiments, storage device 317 may be integrated in server system 301. For example, server system 301 may include one or more hard disk drives as storage device 317.

In other embodiments, storage device 317 may be external to server system 301 and may be accessed by a plurality of server systems 301. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Autonomous Vehicle

Figure 4:
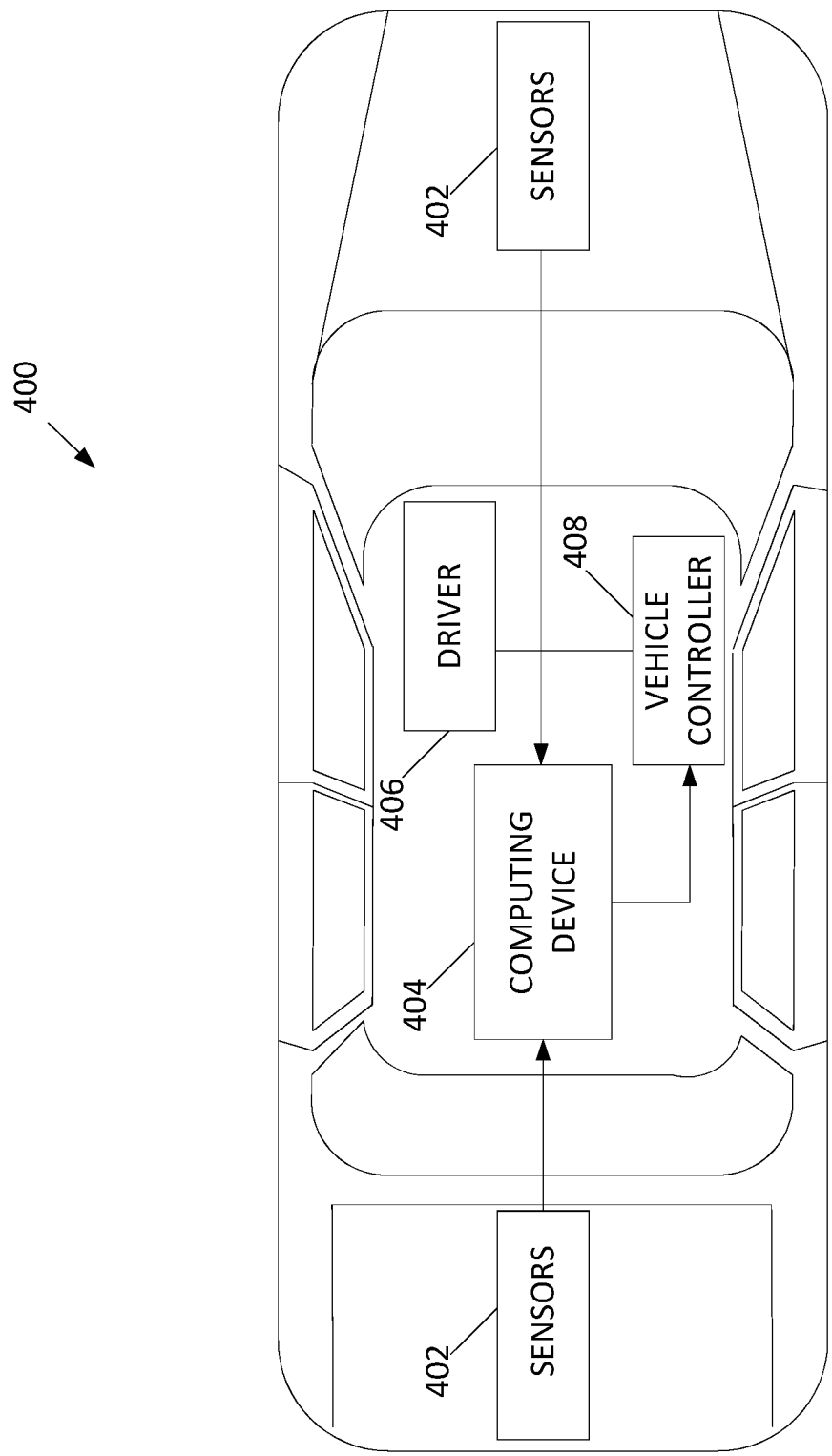
FIG. 4 depicts an exemplary autonomous vehicle that may be used with the vehicle forensics system illustrated in FIG. 1.

FIG. 4 depicts an exemplary autonomous vehicle (AV) 400. AV 400 may be, for example, AV 114 (shown in FIG. 1). AV 400 may be an autonomous or semi-autonomous vehicle capable of fulfilling the transportation capabilities of a traditional automobile or other vehicle. In these embodiments, AV 400 may be capable of sensing its environment and navigating without human input. In some example embodiments, VFA computing device 102 (shown in FIG. 1) may be remote from AV 400 and receive data (e.g., telematics data) from AV 400. Alternatively, VFA computing device 102 may be implemented onboard AV 400, for example as computing device 404.

AV 400 may include a plurality of sensors 402, a computing device 404, and a vehicle controller 408. Sensors 402 may be, for example, sensors 136 (shown in FIG. 2). Further, sensors 402 may include, but are not limited to, temperature sensors, terrain sensors, weather sensors, accelerometers, gyroscopes, radar, LIDAR, Global Positioning System (GPS), video devices, imaging devices, cameras (e.g., 2D and 3D cameras), audio recorders, and computer vision. Sensors 402 may be used to collect, for example, vehicle telematics data, as described above. Such telematics data may be transmitted by VFA computing device 102 (shown in FIG. 1).

Computing device 404 may be implemented, for example, as client computing device 202 (shown in FIG. 2). In exemplary embodiments, computing device 404 may receive data from sensors 402. In embodiments where VFA computing device 102 is remote from AV 400, computing device 404 may transmit data received from sensors 402 (e.g., vehicle telematics data) to VFA computing device 102. Alternatively, VFA computing device 102 may be implemented as computing device 404.

In exemplary embodiments, vehicle controller 408 may control operation of AV 400. For example, vehicle controller 408 may steer, accelerate, or decelerate AV 400 based upon data received, for example, from sensors 402. In some embodiments, vehicle controller 408 may include a display screen or touchscreen (not shown) that is capable of displaying information to and/or receiving input from driver 406.

In other embodiments, vehicle controller 408 may be capable of wirelessly communicating with a user device 116 (shown in FIG. 1) such as a mobile device (not shown) in AV 400. In these embodiments, vehicle controller 408 may be capable of communicating with the user of a mobile device, such as driver 406, through an application on the mobile device. In some embodiments, computing device 404 may include vehicle controller 408.

Exemplary Method for Vehicle Forensics

Figure 5:
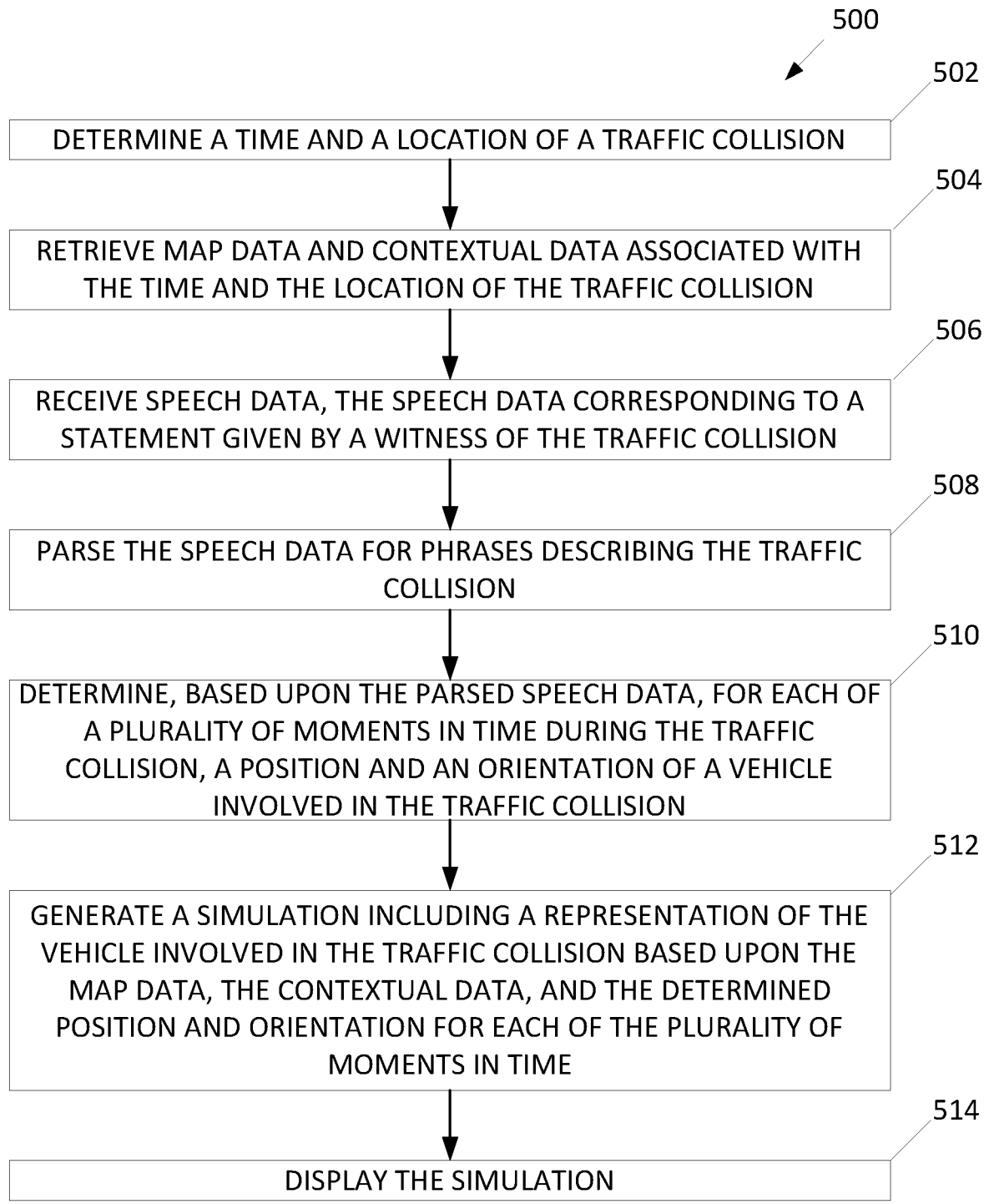
FIG. 5 illustrates an exemplary computer-implemented method that may be performed using the vehicle forensics system illustrated in FIG. 1.

FIG. 5 illustrates an exemplary computer-implemented method 500 for modeling and simulation in vehicle forensics that may be performed using a vehicle forensics system (e.g., vehicle forensics system 100, shown in FIG. 1). In some embodiments, method 500 may be performed by VFA computing device 102 (shown in FIG. 1).

Method 500 may include determining 502 a time and a location of a traffic collision. In some embodiments, method 500 may include retrieving vehicle telematics data and identifying the time based upon the vehicle telematics data. In such embodiments, method 500 may include retrieving the vehicle telematics data from one or more of an automated vehicle, a mobile phone device, or a telematics device. In certain embodiments, method 500 may include retrieving a timestamp and geographic coordinates from a mobile phone device. In some embodiments, method 500 may further include retrieving a document including the time and geographic coordinates indicating the location and parsing the document to determine the time and location. In some embodiments, determining 502 the time and location of the traffic collision may be performed by location determining module 330 (shown in FIG. 3).

Method 500 may further include retrieving 504 map data and contextual data associated with the time and the location of the traffic collision. In some embodiments, retrieving 504 map data and contextual data may be performed by simulation module 334 (shown in FIG. 3).

Method 500 may further include receiving 506 speech data, the speech data corresponding to a statement given by a witness of the traffic collision. In some embodiments, the received speech data may include an audio signal, and method 500 may further include converting the audio signal into text. In such embodiments, method 500 may further include displaying the text. In some embodiments, receiving 506 speech data may be performed by speech analysis module 332 (shown in FIG. 3).

Method 500 may further include parsing 508 the speech data for phrases describing the traffic collision. In certain embodiments, method 500 may include analyzing the parsed speech data to identify inconsistent phrases. In such embodiments, method 500 may further include determining whether to use a phrase based upon whether the phrase is identified as an inconsistent phrase. In some embodiments, parsing 508 speech data may be performed by speech analysis module 332 (shown in FIG. 3).

Method 500 may further include determining 510, based upon the parsed speech data, for each of a plurality of moments in time during the traffic collision, a position and an orientation of a vehicle involved in the traffic collision. In some embodiments, method 500 may further include determining the position and the orientation based upon one or more of vehicle telematics data, vehicle specification data, photographic data, or physics data. In some embodiments, determining 510 the position and the orientation of the vehicle may be performed by simulation module 334 (shown in FIG. 3).

Method 500 may further include generating 512 a simulation including a representation of the vehicle involved in the traffic collision based upon the map data, the contextual data, and the determined position and orientation for each of the plurality of moments in time. In some embodiments, generating 512 the simulation may be performed by simulation module 334 (shown in FIG. 3).

Method 500 may further include displaying 514 the simulation. In some embodiments, processor 305 (shown in FIG. 3) may display 514 the simulation on a remote device, such as a client computing device 200 (shown in FIG. 2). The method may include additional, less, or alternate actions, including those discussed elsewhere herein.

Exemplary Method for Vehicle Forensics

Figure 6:
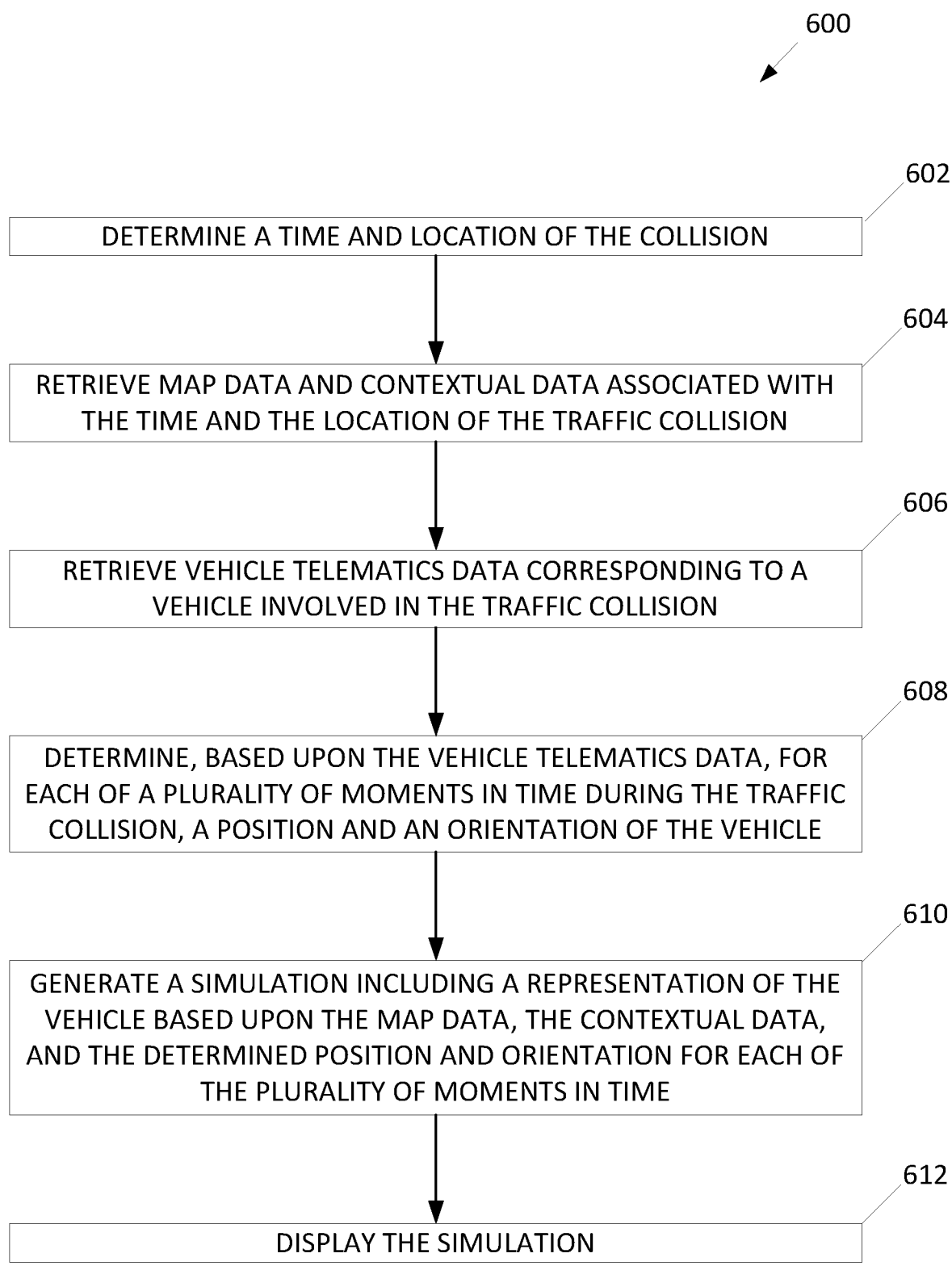
FIG. 6 illustrates an exemplary computer-implemented method that may be performed using the vehicle forensics system illustrated in FIG. 1.

FIG. 6 illustrates an exemplary computer-implemented method 600 for modeling and simulation in vehicle forensics that may be performed using a vehicle forensics system (e.g., vehicle forensics system 100, shown in FIG. 1). In some embodiments, method 600 may be performed by VFA computing device 102 (shown in FIG. 1).

Method 600 may include determining 602 a time and a location of a traffic collision. In some embodiments, method 600 may include retrieving vehicle telematics data and identifying the time based upon the vehicle telematics data. In such embodiments, method 600 may include retrieving the vehicle telematics data from one or more of an automated vehicle, a mobile phone device, or a telematics device. In certain embodiments, method 600 may include retrieving a timestamp and geographic coordinates from a mobile phone device. In some embodiments, method 600 may further include retrieving a document including the time and geographic coordinates indicating the location and parsing the document to determine the time and location. In some embodiments, determining 602 the time and location of the traffic collision may be performed by location determining module 330 (shown in FIG. 3).

Method 600 may further include retrieving 604 map data and contextual data associated with the time and the location of the traffic collision. In some embodiments, retrieving 604 map data and contextual data may be performed by simulation module 334 (shown in FIG. 3).

Method 600 may further include retrieving 606 vehicle telematics data corresponding to a vehicle involved in the traffic collision. In some embodiments, retrieving 606 telematics data may be performed by simulation module 334 (shown in FIG. 3). In some embodiments, method 600 may further include receiving speech data corresponding to a statement given by a witness of a traffic collision. In such embodiments, the speech data may be received by speech analysis module 332 (shown in FIG. 3). In such embodiments the received speech data may include an audio signal, and method 600 may further include converting the audio signal into text and displaying the text. In such embodiments, method 600 may further include parsing the speech data for phrases describing the traffic collision and determining whether to use a phrase based upon whether the phrase is identified as an inconsistent phrase.

Method 600 may further include determining 608, based upon the vehicle telematics data, for each of a plurality of moments in time during the traffic collision, a position and an orientation of the vehicle. In some embodiments, method 600 may further include determining the position and the orientation based upon one or more of vehicle telematics data, vehicle specification data, photographic data, or physics data. In some embodiments, determining 608 the position and the orientation of the vehicle may be performed by simulation module 334 (shown in FIG. 3).

Method 600 may further include generating 610 a simulation including a representation of the vehicle based upon the map data, the contextual data, and the determined position and orientation for each of the plurality of moments in time. In some embodiments, generating 610 the simulation may be performed by simulation module 334 (shown in FIG. 3).

Method 600 may further include displaying 612 the simulation. In some embodiments, processor 305 (shown in FIG. 3) may display 612 the simulation on a remote device, such as a client computing device 200 (shown in FIG. 2). The method may include additional, less, or alternate actions, including those discussed elsewhere herein.

Exemplary Method for Determining the Time and Location of a Traffic Collision

Figure 7:
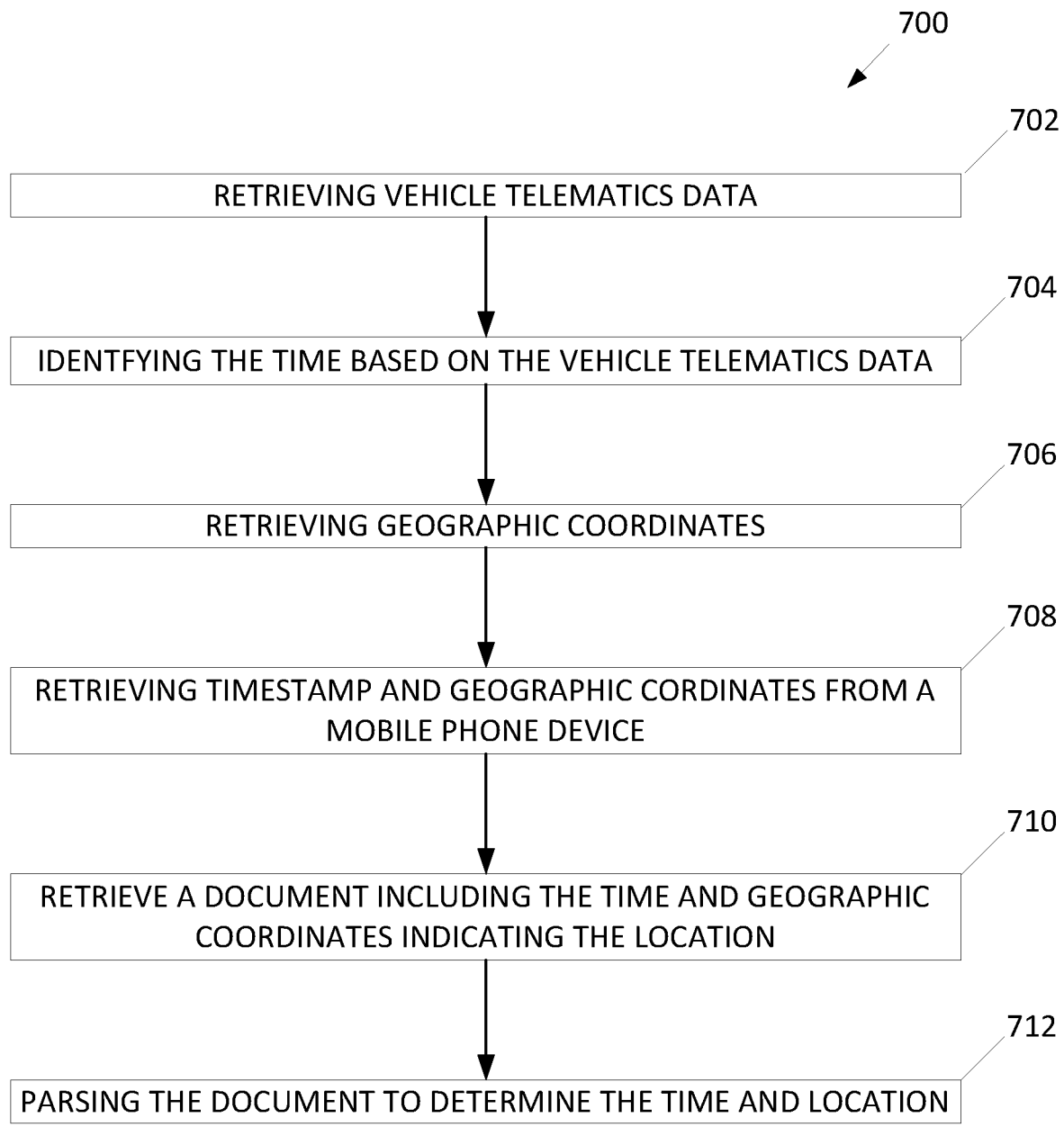
FIG. 7 illustrates an exemplary computer-implemented method for determining a time and a location of a vehicle collision that may be performed using the vehicle forensics system illustrated in FIG. 1.

FIG. 7 illustrates an exemplary computer-implemented method 700 for determining the time and location of a traffic collision that may be performed using a vehicle forensics system (e.g., vehicle forensics system 100, shown in FIG. 1). In some embodiments, method 700 may be performed by VFA computing device 102 (shown in FIG. 1).

Method 700 may include retrieving 702 vehicle telematics data (e.g., from an AV, a mobile phone device, or a telematics device). In some embodiments, retrieving 702 telematics data may be performed by location determining module 330 (shown in FIG. 3).

Method 700 may further include identifying 704 the time of a vehicle collision based upon the vehicle telematics data. In some embodiments, identifying 704 the time of the vehicle collision may be performed by location determining module 330 (shown in FIG. 3).

Method 700 may further include retrieving 706 geographic coordinates (e.g., from the AV, the mobile phone device, or the telematics device). In some embodiments, retrieving 706 geographic coordinates may be performed by location determining module 330 (shown in FIG. 3).

Additionally or alternatively, method 700 may include retrieving 708 a timestamp and geographic coordinates from a mobile phone device (e.g., when a user contacts an insurance representative). In some embodiments, retrieving 708 the timestamp may be performed by location determining module 330 (shown in FIG. 3).

Additionally or alternatively, method 700 may include retrieving 710 a document (e.g., a police report) including the time and geographic coordinates indicating the location. In some embodiments, retrieving 710 the document may be performed by location determining module 330 (shown in FIG. 3).

Method 700 may further include parsing 712 the document to determine the time and location. In some embodiments, parsing 712 the document may be performed by location determining module 330 (shown in FIG. 3). The method may include additional, less, or alternate actions, including those discussed elsewhere herein.

Exemplary Method for Analyzing Speech Data

Figure 8:
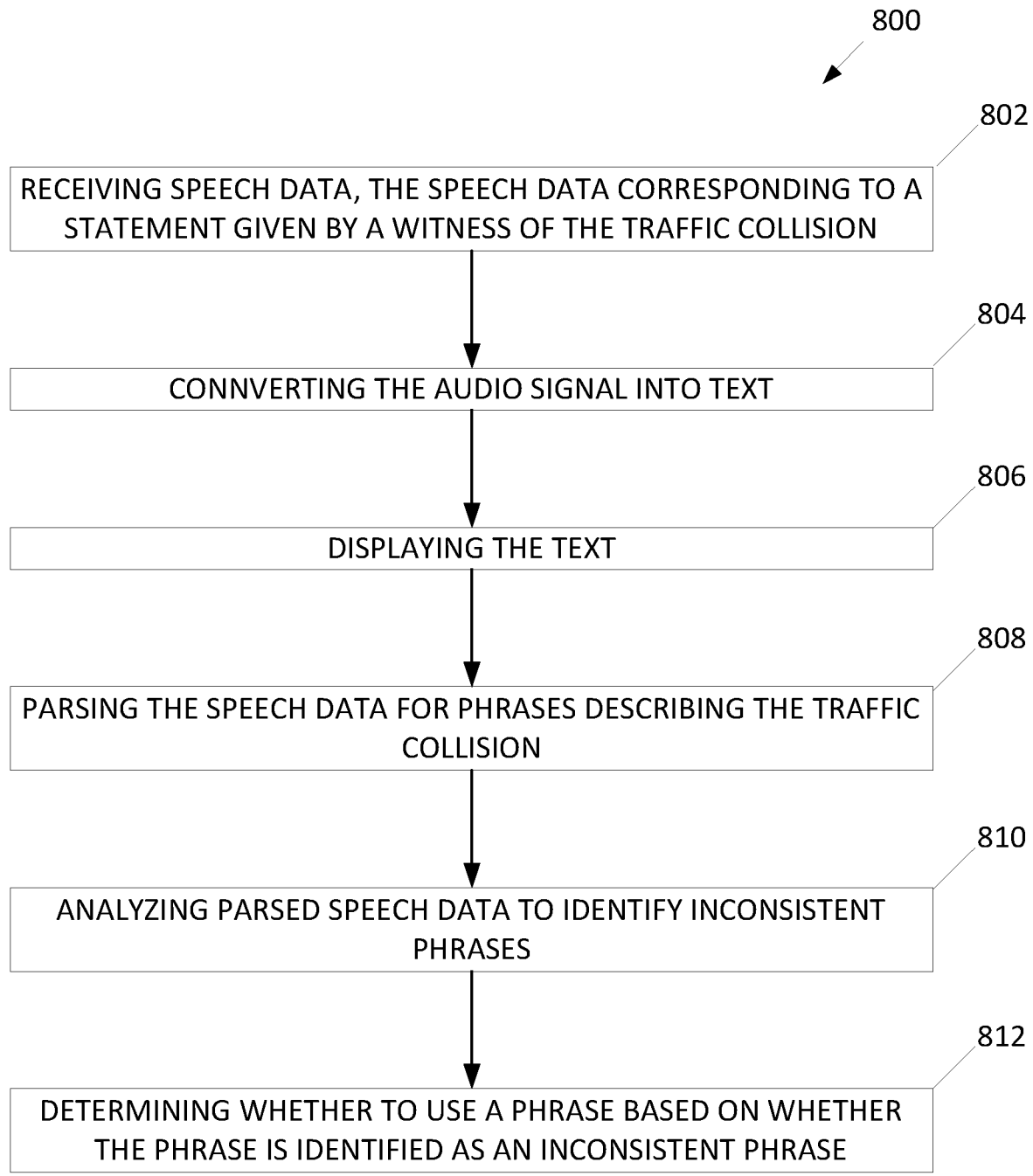
FIG. 8 illustrates an exemplary computer-implemented method for analyzing speech data that may be performed using the vehicle forensics system illustrated in FIG. 1.

FIG. 8 illustrates an exemplary computer-implemented method 800 for analyzing speech data in vehicle forensics that may be performed using a vehicle forensics system (e.g., vehicle forensics system 100, shown in FIG. 1). In some embodiments, method 800 may be performed by VFA computing device 102 (shown in FIG. 1).

Method 800 may include receiving 802 speech data corresponding to a statement given by a witness of a traffic collision. The retrieved speech data may include an audio signal, and method 800 may further include converting 804 the audio signal into text. Method 800 may further include displaying 806 the text. Method 800 may further include parsing 808 the speech data for phrases describing the traffic collision. Method 800 may further include determining 812 whether to use a phrase based upon whether the phrase is identified as an inconsistent phrase. The method may include additional, less, or alternate actions, including those discussed elsewhere herein.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

As described above, the systems and methods described herein may use machine learning, for example, for pattern recognition. That is, machine learning algorithms may be used by VFA computing device 102 to attempt to identify patterns within speech data and between speech data, map data, contextual data, and vehicle telematics data. Further, machine learning algorithms may be used by VFA computing device 102 to generate a scene model for a simulation based upon map data and contextual data and/or generate the simulation based upon speech data and/or vehicle telematics data. Accordingly, the systems and methods described herein may use machine learning algorithms for both pattern recognition and predictive modeling.

EXEMPLARY EMBODIMENTS

In one aspect, a vehicle forensics analytics ("VFA") computing device may be provided. The VFA computing device may include a processor in communication with a memory device, and the processor may be configured to: (1) determine a time and a location of a traffic collision; (2) retrieve map data and contextual data associated with the time and the location of the traffic collision; (3) receive speech data, the speech data corresponding to a statement given by a witness of the traffic collision; (4) parse the speech data for phrases describing the traffic collision; (5) determine, based upon the parsed speech data, for each of a plurality of moments in time during the traffic collision, a position and an orientation of a vehicle involved in the traffic collision; (6) generate a simulation including a representation of the vehicle involved in the traffic collision based upon the map data, the contextual data, and the determined position and orientation for each of the plurality of moments in time; and/or (7) display the simulation to facilitating reconstructing the traffic collision and the events surrounding and associated with the collision. The VFA computing device may include additional, less, or alternate functionality, including that discussed elsewhere herein.

A further enhancement of the VFA computing device includes a processor, wherein to determine the time of the traffic collision, the processor is further configured to retrieve vehicle telematics data and identify the time based upon the vehicle telematics data.

A further enhancement of the VFA computing device includes a processor, wherein the processor is configured to retrieve the vehicle telematics data from one or more of an automated vehicle, a mobile phone device, or a telematics device.

A further enhancement of the VFA computing device includes a processor, wherein to determine the location of the traffic collision, the processor is configured to retrieve geographic coordinates from one or more of an automated vehicle, a mobile phone device, or a telematics device.

A further enhancement of the VFA computing device includes a processor, wherein to determine the time and the location, the processor is configured to retrieve a timestamp and geographic coordinates from a mobile phone device.

A further enhancement of the VFA computing device includes a processor, wherein to determine the time and the location, the processor is configured to retrieve a document including the time and geographic coordinates indicating the location and parse the document to determine the time and the location.

A further enhancement of the VFA computing device includes a processor, wherein the received speech data includes an audio signal and the processor is further configured to convert the audio signal into text.

A further enhancement of the VFA computing device includes a processor, wherein the processor is further configured to display the text.

A further enhancement of the VFA computing device includes a processor, wherein the processor is further configured to analyze the parsed speech data to identify inconsistent phrases.

A further enhancement of the VFA computing device includes a processor, wherein to determine the position and the orientation of the vehicle at each of the plurality of moments in time, the processor is configured to determine whether to use a phrase based upon whether the phrase is identified as an inconsistent phrase.

A further enhancement of the VFA computing device includes a processor, wherein to determine the position and the orientation of the vehicle at each of the plurality of moments in time, the processor is configured to determine the position and orientation based upon one or more of vehicle telematics data, vehicle specification data, photographic data, or physics data.

In another aspect, a computer-implemented method for vehicle forensics may be provided. The computer-implemented method may be implemented by a vehicle forensics analytics ("VFA") computing device including a processor in communication with a memory device. The computer-implemented method including: (1) determining, by the VFA computing device, a time and a location of a traffic collision; (2) retrieving, by the VFA computing device, map data and contextual data associated with the time and the location of the traffic collision; (3) receiving, by the VFA computing device, speech data, the speech data corresponding to a statement given by a witness of the traffic collision; (4) parsing, by the VFA computing device, the speech data for phrases describing the traffic collision; (5) determining, by the VFA computing device, based upon the parsed speech data, for each of a plurality of moments in time during the traffic collision, a position and an orientation of a vehicle involved in the traffic collision; (6) generating, by the VFA computing device, a simulation including a representation of the vehicle involved in the traffic collision based upon the map data, the contextual data, and the determined position and orientation for each of the plurality of moments in time; and/or (7) displaying, by the VFA computing device, the simulation to facilitate traffic collision reconstruction. The method may include additional, less, or alternate actions, including those discussed elsewhere herein.

A further enhancement of the computer-implemented method for vehicle forensics includes, wherein determining the time of the traffic collision includes retrieving, by the VFA computing device, vehicle telematics data and identifying, by the VFA computing device, the time based upon the vehicle telematics data.

A further enhancement of the computer-implemented method for vehicle forensics includes, wherein retrieving the vehicle telematics data includes retrieving, by the VFA computing device, the vehicle telematics data from one or more of an automated vehicle, a mobile phone device, or a telematics device.

A further enhancement of the computer-implemented method for vehicle forensics includes, wherein determining the location of the traffic collision includes retrieving, by the VFA computing device, geographic coordinates from one or more of an automated vehicle, a mobile phone device, or a telematics device.

A further enhancement of the computer-implemented method for vehicle forensics includes, wherein determining the time and the location includes retrieving, by the VFA computing device, a timestamp and geographic coordinates from a mobile phone device.

A further enhancement of the computer-implemented method for vehicle forensics includes, wherein determining the time and the location includes retrieving, by the VFA computing device, a document including the time and geographic coordinates indicating the location and parsing, by the VFA computing device, the document to determine the time and the location.

A further enhancement of the computer-implemented method for vehicle forensics includes, wherein the speech data includes an audio signal and said computer-implemented method further includes converting, by the VFA computing device, the audio signal into text.

A further enhancement of the computer-implemented method for vehicle forensics includes displaying, by the VFA computing device, the text.

A further enhancement of the computer-implemented method for vehicle forensics includes analyzing, by the VFA computing device, the parsed speech data to identify inconsistent phrases.

A further enhancement of the computer-implemented method for vehicle forensics includes, wherein determining the position and the orientation of the vehicle at each of the plurality of moments in time further includes determining, by the VFA computing device, whether to use a phrase based upon whether the phrase is identified as an inconsistent phrase.

A further enhancement of the computer-implemented method for vehicle forensics includes, wherein determining the position and the orientation of the vehicle at each of the plurality of moments in time includes determining, by the VFA computing device, the position and orientation based upon one or more of vehicle telematics data, vehicle specification data, photographic data, or physics data.

In another aspect, a non-transitory computer-readable media having computer-executable instructions embodied thereon may be provided. When executed by a vehicle forensics analytics ("VFA") computing device including a processor in communication with a memory device, the computer-executable instructions cause the processor to: (1) determine a time and a location of a traffic collision; (2) retrieve map data and contextual data associated with the time and the location of the traffic collision; (3) receive speech data, the speech data corresponding to a statement given by a witness of the traffic collision; (4) parse the speech data for phrases describing the traffic collision; (5) determine, based upon the parsed speech data, for each of a plurality of moments in time during the traffic collision, a position and an orientation of a vehicle involved in the traffic collision; (6) generate a simulation including a representation of the vehicle involved in the traffic collision based upon the map data, the contextual data, and the determined position and orientation for each of the plurality of moments in time; and/or (7) display the simulation. The instructions may direct additional, less, or alternate functionality, including that discussed elsewhere herein.

A further enhancement of the non-transitory computer-readable media includes computer-executable instructions, wherein to determine the time of the traffic collision, the computer-executable instructions cause the processor to retrieve vehicle telematics data and identify the time based upon the vehicle telematics data.

A further enhancement of the non-transitory computer-readable media includes computer-executable instructions, wherein the computer-executable instructions cause the processor to retrieve the vehicle telematics data from one or more of an automated vehicle, a mobile phone device, or a telematics device.

A further enhancement of the non-transitory computer-readable media includes computer-executable instructions, wherein to determine the location of the traffic collision, the computer-executable instructions cause the processor to retrieve geographic coordinates from one or more of an automated vehicle, a mobile phone device, or a telematics device.

A further enhancement of the non-transitory computer-readable media includes computer-executable instructions, the computer-executable instructions cause the processor to retrieve a timestamp and geographic coordinates from a mobile phone device.

A further enhancement of the non-transitory computer-readable media includes computer-executable instructions, wherein to determine the time and the location, the computer-executable instructions cause the processor to retrieve a document including the time and geographic coordinates indicating the location and parse the document to determine the time and the location.

A further enhancement of the non-transitory computer-readable media includes computer-executable instructions, wherein the received speech data includes an audio signal and the computer-executable instructions further cause the processor to convert the audio signal into text.

A further enhancement of the non-transitory computer-readable media includes computer-executable instructions, wherein the computer-executable instructions further cause the processor display the text.

A further enhancement of the non-transitory computer-readable media includes computer-executable instructions, wherein the computer-executable instructions further cause the processor to analyze the parsed speech data to identify inconsistent phrases.

A further enhancement of the non-transitory computer-readable media includes computer-executable instructions, wherein to determine the position and the orientation of the vehicle at each of the plurality of moments in time, the computer-executable instructions cause the processor to determine whether to use a phrase based upon whether the phrase is identified as an inconsistent phrase.

A further enhancement of the non-transitory computer-readable media includes computer-executable instructions, wherein to determine the position and the orientation of the vehicle at each of the plurality of moments in time, the computer-executable instructions cause the processor to determine the position and orientation based upon one or more of vehicle telematics data, vehicle specification data, photographic data, or physics data.

In another aspect, an autonomous vehicle (AV) including a vehicle forensics analytics ("VFA") computing device may be provided. The VFA computing device may include a processor in communication with a memory device. The processor may be configured to: (1) determine a time and a location of a traffic collision involving the AV; (2) retrieve map data and contextual data associated with the time and the location of the traffic collision; (3) receive speech data, the speech data corresponding to a statement given by a witness of the traffic collision; (4) parse the speech data for phrases describing the traffic collision; (5) determine, based upon the parsed speech data, for each of a plurality of moments in time during the traffic collision, a position and an orientation of the AV during the traffic collision; (6) generate a simulation including a representation of the AV based upon the map data, the contextual data, and the parsed speech data; and the determined position and orientation of the AV for each of the plurality of moments in time; and/or (7) display the simulation to facilitate collision reconstruction. The AV and/or VFA computing device may include additional, less, or alternate functionality, including that discussed elsewhere herein.

A further enhancement of the AV includes a processor, wherein to determine the time of the traffic collision, the processor is further configured to retrieve vehicle telematics data and identify the time based upon the vehicle telematics data.

A further enhancement of the AV includes a processor, wherein the received speech data includes an audio signal and the processor is further configured to convert the audio signal into text.

A further enhancement of the AV includes a processor, wherein the processor is further configured to display the text.

A further enhancement of the AV includes a processor, wherein the processor is further configured to analyze the parsed speech data to identify inconsistent phrases.

A further enhancement of the AV includes a processor, wherein to determine the position and the orientation of the AV at each of the plurality of moments in time, the processor is configured to determine whether to use a phrase based upon whether the phrase is identified as an inconsistent phrase.

A further enhancement of the AV includes a processor, wherein to determine the position and the orientation of the AV at each of the plurality of moments in time, the processor is configured to determine the position and orientation based upon one or more of vehicle telematics data, vehicle specification data, photographic data, or physics data.

A further enhancement of the AV includes a processor, wherein the processor is further configured to retrieve vehicle telematics data and determine, based upon the retrieved vehicle telematics data, for each of the plurality of moments in time during the traffic collision, the position and an orientation of the AV during the traffic collision.

Exemplary Aspects

In some aspects, the present embodiments may focus on using current and future technology to automate and enhance the claims process, specifically the initial loss report and claim investigation. The invention assists in automating the initial claim loss set up by using geolocation from the initial loss report to automate an aerial map of the scene of the accident and provide time specific contextual data. The present embodiments may also use a natural language processor to dictate live calls using speech to text capabilities, automatically transcribing driver and witness verbal statements in real time for the claim file. The present embodiments may then render the statements and details of the accident into a crash simulator, which would reconstruct the path of the vehicles as described by the drivers, witnesses, and points of contact. Lastly, using AI, the present embodiments may use vehicle data, scene photos, and vehicle damage photos to validate the crash reconstruction and statements of loss to assess liability.

The current claims process is highly manual and costly, where the majority of the liability is open to human error by the claims employees or parties of the loss. Currently, if a claims employee wants to find a map of the location they have to use the internet and are unable to validate how accurate or dated those maps are. Also, claims employees interpret and paraphrase driver statements for the claims file, but if they have been recorded then they have to be sent for transcription, incurring additional costs. Currently, claims employees use toy cars to reconstruct accidents and points of contact. The present embodiments may leverage current and developing technology to eliminate human and use data and AI to provide the claims employees with enhanced tools to complete their investigation.

In one aspect, an application may provide update to date and accurate maps, data, and photos from validated data sources. The application may provide an unbiased output for recording statements and recreating those recollections. Additionally, the application may reconstruct crashes using real world engineering and physics parameters (car weight, speed).

In one aspect, the present embodiments may provide a contextualized map of the scene of an accident. When the claim is filed, the platform will use existing maps (Map or Mapping API) and digital assets/models (urban layouts, buildings, vehicles) to recreate aerial and street level 2D and 3D maps of the scene of the accident in the simulator component using geolocation (the address, location, or GPS coordinates) of the loss. The map is configured to allow claims associates to review the scene and familiarize themselves with the location prior to contacting any drivers or witnesses.

The present embodiments may also provide time-specific contextual data (local condition information). When the claim is filed, the platform will use date and time stamps provided by the drivers, police reports, and/or vehicle data to provide contextual data at the time of the accident. The contextual data output may be pulled automatically, and provide the claims employee with the weather, visibility, road conditions, traffic, construction, and daylight/night time conditions from API sources.

The present embodiments may also provide speech to text functionality, including a dictated statement of loss. As the Claims Associate speaks with drivers and witnesses and takes their statements over the phone, the application will use a Natural Language Processor to dictate the statement using speech to text, which will be used for the claim file notes/log, investigation, determination of liability/fault, subrogation, and litigation.

The present embodiments may also provide a collision physics simulator. The application would upload in real time the details of the accident into the collision simulator to recreate a video of the path of the vehicles and point of contact. Based upon the vehicle details in the file, the application may be configured to use real world and validated vehicle physical and engineering specifications related to gross weight, acceleration, deceleration, crump zones, etc. Using AI deep learning and ADS data acquisition, the application may use ADA data (semantic segmentation, depth map) scene photos (taken by the driver, vehicle, or vendor), and vehicle damage photos (estimatics) to validate statements by those involved or witnesses.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An autonomous vehicle (AV) comprising:
    a vehicle body; and
    a vehicle computing device comprising a processor in communication with a memory device, the processor configured to:
    identify a time and a geographic location of a traffic collision involving the AV;
    retrieve map data and contextual data associated with the time and the geographic location of the traffic collision;
    retrieve vehicle telematics data collected by sensors coupled to the vehicle body;
    receive speech data from a witness of the traffic collision;
    determine, based upon the retrieved vehicle telematics data and the received speech data, for each of a plurality of moments in time during the traffic collision, a position and an orientation of the AV during the traffic collision;
    generate a simulation of the traffic collision including a representation of the AV based upon the map data, the contextual data, and the determined position and orientation of the AV for each of the plurality of moments in time; and
    provide content to enable display of the simulation on a display device.

2. The AV of claim 1, wherein the processor is further configured to identify the time of the traffic collision based upon the vehicle telematics data, the time of the traffic collision including a time period starting before a collision event of the collision and ending after the collision event.

3. The AV of claim 1, wherein the processor is further configured to:
    receive the speech data from the witness of the traffic collision using a microphone in communication with the processor; and
    parse the speech data for phrases describing the traffic collision.

4. The AV of claim 3, wherein the received speech data is received as an audio signal, and the processor is further configured to convert the audio signal into text.

5. The AV of claim 4, wherein the processor is further configured to cause the text to be displayed on the display device.

6. The AV of claim 3, wherein the processor is further configured to analyze the parsed speech data, and identify inconsistent phrases by comparing the inconsistent phrases to one or more of the map data, the contextual data, the telematics data, or other phrases obtained from the parsed speech data to determine that the inconsistent phrases are not consistent with the map data, the contextual data, the telematics data, or other phrases obtained from the parsed speech data.

7. The AV of claim 6, wherein, the processor is further configured to determine whether to use a phrase based upon whether the phrase is identified as an inconsistent phrase.

8. The AV of claim 1, wherein the processor is further configured to generate the simulation of the traffic collision by determining the position and orientation of the AV at each of the moments in time based further upon one or more of vehicle specification data stored in the memory device, photographic data collected by one or more of the sensors or from third-party providers, or physics data.

9. A computer-implemented method performed by an autonomous vehicle (AV) including a vehicle computing device, the vehicle computing device including a processor in communication with a memory device, the method comprising:
    identifying, by the vehicle computing device, a time and a geographic location of a traffic collision involving the AV;
    retrieving, by the vehicle computing device, map data and contextual data associated with the time and the geographic location of the traffic collision;
    retrieving, by the vehicle computing device, vehicle telematics data collected by sensors associated with the AV;
    receiving, by the vehicle computing device, speech data from a witness of the traffic collision;
    determining, by the vehicle computing device, based upon the retrieved vehicle telematics data and the received speech data, for each of a plurality of moments in time during the traffic collision, a position and an orientation of the AV during the traffic collision;
    generating, by the vehicle computing device, a simulation of the traffic collision including a representation of the AV based upon the map data, the contextual data, and the determined position and orientation of the AV for each of the plurality of moments in time; and
    providing, by the vehicle computing device, content to enable display of the simulation on a display device.

10. The computer-implemented method of claim 9, further comprising identifying, by the vehicle computing device, the time of the traffic collision based upon the vehicle telematics data, the time of the traffic collision including a time period starting before a collision event of the collision and ending after the collision event.

11. The computer-implemented method of claim 9, further comprising:
    receiving, by the vehicle computing device, the speech data from the witness of the traffic collision using a microphone in communication with the processor; and
    parsing, by the vehicle computing device, the speech data for phrases describing the traffic collision.

12. The computer-implemented method of claim 11, further comprising analyzing, by the vehicle computing device, the parsed speech data, and identify inconsistent phrases by comparing the inconsistent phrases to one or more of map data, the contextual data, the telematics data, or other phrases obtained from the parsed speech data to determine that the inconsistent phrases are not consistent with the map data, the contextual data, the telematics data, or other phrases obtained from the parsed speech data.

13. The computer-implemented method of claim 12, further comprising determining, by the vehicle computing device whether to use a phrase based upon whether the phrase is identified as an inconsistent phrase.

14. The computer-implemented method of claim 11 wherein the received speech data is received as an audio signal, and wherein the computer-implemented method further includes converting, by the vehicle computing device, the audio signal into text.

15. The computer-implemented method of claim 14, further comprising causing, by the vehicle computing device, the text to be displayed on the display device.

16. The computer-implemented method of claim 9, further comprising generating, by the vehicle computing device, the simulation of the traffic collision by determining the position and orientation of the AV at each of the moments in time based further upon one or more of vehicle specification data stored in the memory device, photographic data collected by one or more of the sensors or from third-party providers, or physics data.

17. At least one non-transitory computer-readable media having computer-executable instructions embodied thereon, wherein when executed by an autonomous vehicle (AV) computing device having a processor, the computer-executable instructions cause the processor to:
identify a time and a geographic location of a traffic collision involving the AV;
retrieve map data and contextual data associated with the time and the geographic location of the traffic collision;
retrieve vehicle telematics data collected by sensors associated with the AV;
receive speech data from a witness of the traffic collision;
determine, based upon the retrieved vehicle telematics data and the received speech data, for each of a plurality of moments in time during the traffic collision, a position and an orientation of the AV during the traffic collision;
generate a simulation of the traffic collision including a representation of the AV based upon the map data, the contextual data, and the determined position and orientation of the AV for each of the plurality of moments in time; and
provide content to enable display of the simulation on a display device.

18. The non-transitory computer-readable media of claim 17, wherein the computer-executable instructions further cause the processor to identify the time of the traffic collision based upon the vehicle telematics data, the time of the traffic collision including a time period starting before a collision event of the collision and ending after the collision event.

19. The non-transitory computer-readable media of claim 17, wherein the computer-executable instructions further cause the processor to:
receive the speech data from the witness of the traffic collision using a microphone in communication with the processor; and
parse the speech data for phrases describing the traffic collision.

20. The non-transitory computer-readable media of claim 19, wherein the received speech data is received as an audio signal, and the computer-executable instructions further cause the processor to convert the audio signal into text.

* * * * *